(12) United States Patent
Hurwitz et al.

(10) Patent No.: US 12,489,643 B2
(45) Date of Patent: Dec. 2, 2025

(54) RESISTOR BASED PHYSICAL UNCLONABLE FUNCTION

(71) Applicant: Analog Devices International Unlimited Company, Limerick (IE)

(72) Inventors: Jonathan Ephraim David Hurwitz, Edinburgh (GB); Jose Bernardo Din, Biclatan (PH)

(73) Assignee: Analog Devices International Unlimited Company, Limerick (IE)

( * ) Notice: Subject to any disclaimer, the term of this patent is extended or adjusted under 35 U.S.C. 154(b) by 243 days.

(21) Appl. No.: 17/963,587

(22) Filed: Oct. 11, 2022

(65) Prior Publication Data
US 2024/0121113 A1   Apr. 11, 2024

(51) Int. Cl.
*H04L 9/32* (2006.01)
*H02M 1/00* (2006.01)
*H02M 3/135* (2006.01)

(52) U.S. Cl.
CPC ......... *H04L 9/3278* (2013.01); *H02M 1/0006* (2021.05); *H02M 3/135* (2013.01); *H04L 2209/12* (2013.01)

(58) Field of Classification Search
CPC . H04L 9/3278; H04L 9/0866; H04L 2209/12; H02M 1/0006; H02M 3/135
See application file for complete search history.

(56) References Cited

U.S. PATENT DOCUMENTS

| | | | |
|---|---|---|---|
| 9,218,477 B2 | 12/2015 | Lewis et al. | |
| 10,177,924 B1 * | 1/2019 | Chen | H04L 9/3278 |
| 10,216,965 B2 | 2/2019 | Plusquellic et al. | |
| 10,243,749 B2 * | 3/2019 | Park | G09C 1/00 |
| 10,748,591 B2 | 8/2020 | Shao | |
| 11,240,047 B2 | 2/2022 | Hurwitz | |
| 2007/0216561 A1 * | 9/2007 | Anthony | G11C 11/412 341/154 |
| 2018/0337793 A1 * | 11/2018 | Park | G11C 16/28 |

(Continued)

FOREIGN PATENT DOCUMENTS

| | | | | |
|---|---|---|---|---|
| CN | 105160276 B | * | 9/2017 | G06F 21/76 |
| CN | 107766749 B | * | 3/2021 | G06F 21/73 |

(Continued)

OTHER PUBLICATIONS

"European Application Serial No. 23201528.9, Extended European Search Report mailed Feb. 14, 2024", 8 pgs.

(Continued)

*Primary Examiner* — Michael R Vaughan
*Assistant Examiner* — Abdullah Almamun
(74) *Attorney, Agent, or Firm* — Schwegman Lundberg & Woessner, P.A.

(57) ABSTRACT

A Physical Unclonable Function, PUF, apparatus is disclosed. The apparatus comprises a plurality of PUF cells that each comprise a first potential divider and a second potential divider. The apparatus also comprises a determination unit that comprises a selection unit for selecting at least one of the plurality of PUF cells, and a readout unit coupled to each selected PUF cell. The readout unit is configured to determine a PUF value for the selected PUF cell based on a difference between a first analog voltage at the first potential divider and a second analog voltage at the second potential divider.

18 Claims, 16 Drawing Sheets

(56) References Cited

U.S. PATENT DOCUMENTS

| | | | |
|---|---|---|---|
| 2019/0363714 A1 | 11/2019 | O'dwyer et al. | |
| 2020/0045033 A1 | 2/2020 | Flikkema et al. | |
| 2021/0184870 A1* | 6/2021 | Hurwitz | G09C 1/00 |
| 2021/0314178 A1 | 10/2021 | Aronson | |
| 2022/0043937 A1 | 2/2022 | Spalding et al. | |
| 2022/0399056 A1* | 12/2022 | Park | G11C 13/0038 |

FOREIGN PATENT DOCUMENTS

| | | | | |
|---|---|---|---|---|
| KR | 20140014538 A * | 7/2012 | | G06F 21/75 |
| KR | 101359783 B1 | 2/2014 | | |
| KR | 102341265 B1 * | 12/2021 | | G06F 21/17 |
| KR | 102459306 B1 * | 10/2022 | | G06F 21/71 |

OTHER PUBLICATIONS

"Japanese Application Serial No. 2023-175158, Notification of Reasons for Refusal mailed Jan. 28, 2025", w/ English Translation, 18 pgs.

Tanaka, Yuki, "A Study on Memristor-based PUFs with Paired Responses", Design Automation Symposium collected papers, Japan, Information Processing Society of Japan, w/ English abstract, (Aug. 22, 2018), 124-129.

* cited by examiner

RESISTOR BASED PHYSICAL UNCLONABLE FUNCTION

TECHNICAL FIELD

The present disclosure relates to a resistor based, physical unclonable function (PUF).

BACKGROUND

A physical unclonable function (sometimes also called physically unclonable function) or 'PUF' is a physical entity capable of generating an output ('response') to a given input ('challenge') that is unique to that particular PUF such that it can be regarded as a 'fingerprint'. This capacity is typically arrived at by devising the PUF in such a way that its output depends upon features that differ randomly in each device due to minor manufacturing variations. Thus, a PUF cannot be readily replicated with the correct fingerprint, even with full knowledge of its circuit layout. The response may be used for various different purposes, for example in cryptographic operations to secure communications to/from a device that includes the PUF, or used in a process of authenticating the identity of a device that includes the PUF, etc.

A PUF apparatus may comprise one or more PUF cells, each comprising some physical features that differ randomly in each device due to minor manufacturing variations, and some determination circuitry configured to readout a PUF value from each of the PUF cells. The PUF apparatus may be configured such that the determination circuitry can read out a random PUF value from each of the PUF cells and generate a persistent random number based on the PUF value(s). The persistent random number may then be used as part of the determination of a 'response' to a 'challenge'. For example, the PUF apparatus may receive a 'challenge' from another circuit, the determination circuitry may then read the persistent random number from the PUF cells and the PUF apparatus may then determine a 'response' based on the 'challenge' and the persistent random number (for example, by carrying out some cryptographic operation, such as a hash, or XOR, or encryption using the 'challenge' and the persistent random number). A persistent random number is random in that its value is dependent on the minor, random manufacturing variations between different PUF apparatus. Thus, different instances of the PUF apparatus, whilst identical in design, should each generate a different, persistent random number. A random number is 'persistent' in that it should stay the same, or stay the same within acceptable limits, over time. For example, the persistent random number generated by the PUF apparatus should be the same each time it is generated (or stay the same within acceptable limits, for example so that it can be corrected using error correcting code, ECC), so that it can act as a reliable fingerprint of the device.

SUMMARY

The present disclosure relates to a PUF apparatus for generating a persistent, random number (the PUF output). The number is random in that each particular instance of the PUF apparatus should generate a randomly different number to all other instances of the PUF apparatus, and is persistent in that each particular instance of the PUF apparatus should repeatedly generate the same number, within acceptable error correction tolerances. The random number is determined by selecting one or more PUF cells, each of which comprise a full resistor bridge, or H-bridge (eg, a pair of potential dividers), and determining a PUF value that is accurately and reliably indicative of a random impedance difference between the two sides of the bridge, based on which the random number, the PUF output, is generated. The random manufacturing differences between the resistors creates the randomness in the generated random number. Furthermore, because the random manufacturing differences should be relatively stable over time, the generated random number should be persistent.

The output from each PUF cell may be a pair of analog signals, one signal from each side of the H-bridge. The difference between those two signals can then be used by circuitry outside of the PUF cell (for example, in a determination unit or circuit) to determine a persistent random PUF value for that PUF cell. By outputting a pair of analog signals, the number of components within each PUF cell may be minimised. This may help to reduce the size and cost of an array of PUF cells, and may also help to maintain the randomness of the PUF value generated for each PUF cell, since there are few components to potentially contribute to any systematic bias (for example, resulting in the impedance of one side of the H-bridge appearing to be higher than that on the other side with a greater than 50:50 chance). Furthermore, outputting analog signals means that optionally the magnitude of the random difference may be measured. This may be useful, for example, when initially configuring/calibrating the PUF apparatus to exclude the use of PUF cells that have a very small random difference between the two sides of the H-bridge. A degree of change, owing to device aging and environmental conditions, may be expected over time. As a result, over time the PUF value may change for a PUF cell having a very small random difference. By enabling the measurement of the size of the difference, it is possible to exclude those PUF cells from use in determining the PUF output, thereby improving the long term persistence of the PUF output.

In a first aspect of the disclosure, there is provided a Physical Unclonable Function, PUF, apparatus comprising: a plurality of PUF cells, each PUF cell comprising: a first potential divider comprising a first resistor and a second resistor connected to each other in series at a first measurement point; and a second potential divider, coupled in parallel to the first potential divider, and comprising a third resistor and a fourth resistor connected to each other in series at a second measurement point; and a determination unit comprising: a selection unit for selecting at least one of the plurality of PUF cells; and a readout unit coupled to the first coupling point and the second coupling point of each selected PUF cell and configured to: determine a PUF value for the selected PUF cell based on a difference between a first analog voltage at the first measurement point and a second analog voltage at the second measurement point when an input voltage is applied across the first potential divider and the second potential divider.

Each of the plurality of PUF cells may further comprise: a selection mechanism that is controllable by the selection unit for selecting the PUF cell.

The selection mechanism may comprise: a first cell enable switch coupled to the first potential divider, the second potential divider and a first voltage supply line, such that the first potential divider and the second potential divider are switchably coupled to the first voltage supply line by the first cell enable switch, wherein a state of the first cell enable switch is controlled by the selection unit, and wherein selecting a PUF cell comprises setting the state of the first cell enable switch in the PUF cell to couple the first potential divider and the second potential divider to the first voltage supply line. The first voltage supply line may be a high voltage supply line or a low voltage supply line.

Additionally or alternatively, the selection mechanism may comprise: a first addressing switch coupled to the first measurement point and the readout unit, such that the first measurement point is switchably coupled to the readout unit by the first addressing switch; and a second addressing switch coupled to the second measurement point and the readout unit, such that the second coupling point is switchably coupled to the readout unit by the second addressing switch, wherein a state of the first addressing switch and a state of the second addressing switch is controlled by the selection unit, and wherein selecting a PUF cell comprises setting the state of the first addressing switch in the PUF cell to couple the first measurement point to the readout unit, and setting the state of the second addressing switch in the PUF cell to couple the second measurement point to the readout unit.

Alternatively, the selection mechanism may comprise: a first access switch coupled to the first resistor, such that a high voltage supply line and the first measurement point are switchably coupled to each other by the first resistor and the first access switch; a second access switch coupled to the second resistor, such that a low voltage supply line and the first measurement point are switchably coupled to each other by the second resistor and the second access switch; a third access switch coupled to the third resistor, such that the high voltage supply line and the second measurement point are switchably coupled to each other by the third resistor and the third access switch; and a fourth access switch coupled to the fourth resistor, such that the low voltage supply line and the second measurement point are switchably coupled to each other by the fourth resistor and the fourth access switch, wherein a state of the first access switch, a state of the second access switch, a state of the third access switch and a state of the fourth access switch are controlled by the selection unit.

For each of the plurality of PUF cells the selection unit may be coupled to the selection mechanism with a selection signal line that the selection unit uses to control the selection mechanism by applying a selection control signal to the selection signal line.

The plurality of PUF cells may be organised as a matrix of rows and columns, wherein for each row in the matrix, the PUF cells share a selection signal line such that a selection control signal applied to a selection signal line for a particular row of PUF cells controls the selection mechanism in each of PUF cells in that particular row.

The plurality of PUF cells may be organised as a matrix of rows and columns, wherein the apparatus further comprises: for each column in the matrix, a second cell enable switch coupled to a second voltage supply line and to the first potential divider and the second potential divider in each PUF cell in the column, such that the first potential divider and the second potential divider in each PUF cell in a column of the matrix are coupled to the second voltage supply line by a respective second cell enable switch; wherein a state of the second cell enable switch is controlled by the selection unit, and wherein selecting a PUF cell comprises setting the state of the second cell enable switch for the column in which the PUF cell is located to couple the first potential divider and the second potential divider to the second voltage supply line.

For each PUF cell the first resistor and the third resistor may be matched resistors, and the second resistor and fourth resistor may be matched resistors.

Optionally, each of the first resistor, second resistor, third resistor and fourth resistor may comprise one or more unit resistor. The plurality of unit resistors making up the first potential divider and the second potential dividers may be arranged such that a centre of mass of the unit resistors making up the first potential divider is substantially the same as a centre of mass of the unit resistors making up the second potential divider.

The readout unit may further comprise an analog to digital converter, ADC, coupled to the first measurement point and the second measurement point of the selected PUF cell and configured to generate a digital representation of a difference between the first analog voltage and the second analog, wherein the PUF apparatus further comprises a voltage reference generator for supplying at least one ADC reference voltage to the ADC, wherein the at least one ADC reference voltage is associated with the input voltage in such a way that a change in the input voltage is reflected by a change in the at least one ADC reference voltage, and wherein the voltage reference generator comprises a ratioed replica of at least part of a PUF cell for generating the at least one ADC reference voltage.

The reference generator may receive the input voltage and generate the at least one ADC reference voltage based on the input voltage.

The voltage reference generator may comprise a ratioed replica of at least one current path of a PUF cell and the input voltage is applied across the ratioed replica of the PUF cell, wherein the at least one ADC reference voltage is derived from a potential divider of the ratioed replica of the PUF cell.

The determination unit may be configured for selecting two or more PUF cells and determining, in parallel, a respective PUF value for each of the selected two or more PUF cells.

The plurality of PUF cells may be organised as a matrix of rows and columns, wherein the determination unit comprises a readout unit for each column.

The plurality of PUF cells may be organised as a matrix of rows and columns, wherein the matrix of PUF cells are organised as a plurality of grouped columns, with each grouped column comprises two or more columns of PUF cells, and wherein the determination unit comprises a readout unit for each grouped column, and wherein each readout unit comprises a multiplexer for selecting any one of the columns within the grouped column for the determination of a PUF value.

In a second aspect of the present disclosure, there is provided a method of determining a PUF value using a PUF cell that is one of a plurality of PUF cells, the method comprising: selecting the PUF cell, wherein the PUF cell comprises an H-bridge of resistors and selecting the PUF cell results in the PUF cell being enabled by a supply voltage across the H-bridge and the two measurement points of the H-bridge being coupled to a readout unit; and determining, by the readout unit, the PUF value for the PUF cell based on the analog voltages at the two measurement points of the PUF cell.

In a third aspect of the present disclosure, there is provided a PUF apparatus comprising: a PUF cell comprising at least one component; and a readout unit comprising: an analog to digital converter for converting an analog value received from the PUF cell, wherein the analog value is dependent on the at least one component in the PUF cell and a stimuli voltage applied to the PUF cell; and a reference generator configured to supply to the analog-to-digital converter a reference voltage, wherein either: the reference voltage is dependent on the stimuli voltage such that a change in stimuli voltage causes a change in reference voltage, or the stimuli voltage is dependent on the reference voltage such that a change in reference voltage causes a change in stimuli voltage.

The reference generator may further comprise a replica of at least part of the PUF cell, wherein the reference generator is configured to generate the reference voltage using the stimuli voltage and the replica of the at least part of the PUF cell.

The PUF cell may comprise a potential divider and the replica of the PUF cell comprises a replica of the potential divider, and wherein the stimuli voltage is applied to the replica of the potential divider and the reference voltage is derived from the replica of the potential divider.

The at least one component in the replica of the PUF cell may be identical to the at least one component in the PUF cell, or is a smaller, scaled version of the at least one component of the PUF cell.

DRAWINGS

Aspects of the present disclosure are described, by way of example only, with reference to the following drawings, in which:

FIG. 4b shows a schematic circuit representation of the resistors of FIG. 4a;

FIG. 8b shows schematic details of an example PUF cell within the PUF apparatus/system of FIG. 8a;

FIG. 9 shows a schematic example configuration of at least part of a readout unit of the PUF apparatus/system of FIG. 8a;

FIG. 10b shows an example layout of the reference generator of FIG. 10a;

DETAILED DESCRIPTION

Figure 1:
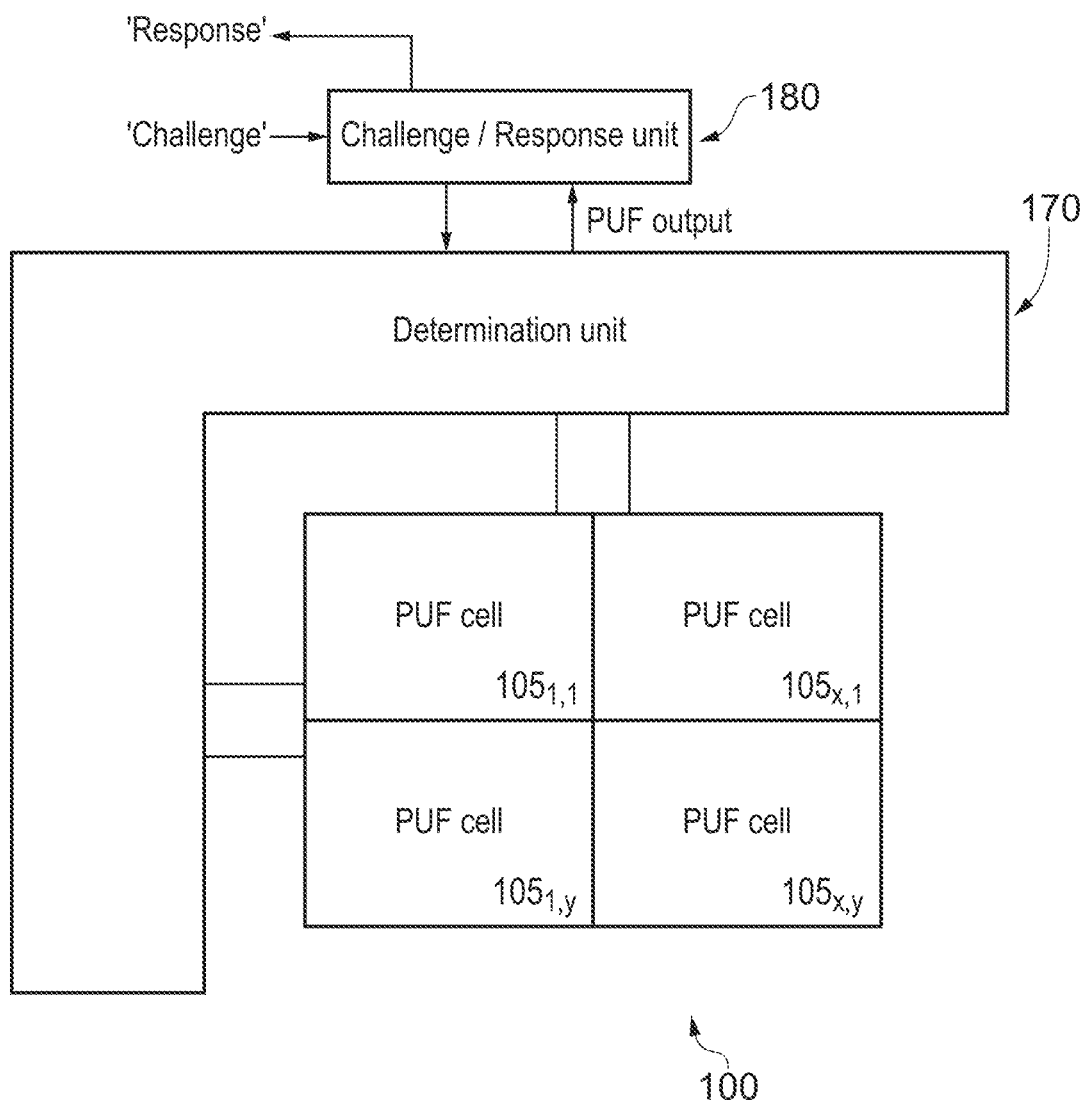
FIG. 1 shows an example schematic representation of PUF apparatus/system in accordance with an aspect of the disclosure.

The inventors have identified many different challenges in implementing a PUF apparatus with one or more PUF cells. First, each possible output of a PUF cell should have an equal, or substantially equal, probability. For example, if a PUF cell is configured to be used generate a '1' or a '0' depending on random manufacturing variations the PUF cell, there should be an equal, or substantially equal, probability of a '1' or a '0'. If this is not achieved, the output of the PUF apparatus may not be sufficiently random. Achieving this requires a circuit design and layout configuration of each PUF cell, and the PUF apparatus overall, that will not favour any one particular possible output value.

Second, it is preferable for the PUF apparatus to be low cost, in terms of power consumption and/or area used in an integrated circuit (IC) and/or time required to generate the PUF output, so that it can be implemented in devices more easily. For example, PUF apparatus may be particularly useful for Internet of Things (IoT) device security, such as for authenticating the identity of an IoT device and/or securing communications to/from an IoT device. In order to include a PUF apparatus in an IoT device, it is helpful for the PUF apparatus to be cheap and/or low power and/or small.

Third, since the random number generated by the PUF apparatus should be persistent, it is preferable that any PUF cell measurements/readings on which the random number is based are relatively stable and consistent over time, for example even with changes in environmental conditions, such as temperature changes, supply voltage changes, etc. Therefore, it is preferable that any PUF cell characteristics that determine the value of the random number are relatively stable over time and are measured accurately and reliably over time, so that the random number remains the same (or the same within acceptable tolerances, such as the tolerances required for effective error correction coding, ECC).

To address at least some of these challenges, a PUF apparatus is disclosed herein, which comprises a plurality of PUF cells. Each of the PUF cells includes a pair of devices, which are a pair potential dividers arranged as a full resistor bridge, or H-bridge. The divider ratio of the two potential dividers making up the H-bridge may be designed to be identical to each other, but the resistors will inherently have some random manufacturing differences, which should result in some randomness in the actual divider ratios of the potential dividers. This should result, for each of the PUF cells, in some random imbalance between the two devices, specially a random imbalance of the divider ratios on either side of the bridge. These random manufacturing differences may be detected for one or more of the PUF cells from the potential difference between the voltages on the two sides of the bridge. Thus, a PUF value may be determined for each of one or more of the PUF cells based on the difference in voltage across the bridge, and a persistent random number can be generated for the PUF apparatus from the one or more PUF values.

By arranging the resistors in an H-bridge configuration, random differences in the impedance ratios of the two devices (the two potential dividers) may be accurately detected based on the divided voltage from each of the two potential dividers. Furthermore, because each PUF cell is identical in design and layout, current follows the same path in each PUF cell and travels the same distance on either side of the H-bridge within each cell. This means there is no inherent impedance imbalances towards one side of the bridge in some of the PUF cells, caused by the current travelling through a longer conductive path on one side of the bridge than the other in some of the PUF cells. Such an inherent imbalance would reduce the randomness of the PUF values at are generated from those PUF cells. Finally, each PUF cell outputs an analog differential voltage that is indicative of the random manufacturing difference between the two matched devices, i.e. the imbalance between the two sides of the bridge. By outputting an analog differential voltage from a PUF cell and then determining a PUF value based on that voltage, the number of non-resistor components within each PUF cell may be minimised, thereby minimising the influence of other components on the determination of the PUF value, which should improve the randomness of the PUF value. Furthermore, it ensures that the matched components that are being compared (i.e., the two potential dividers that make up the H-bridge) are within the same PUF cell. This prevents the types of systematic bias that may exist in configurations where PUF cell components are being compared to a common reference value or component.

FIG. 1 shows an example schematic representation of PUF apparatus/system 100 in accordance with an aspect of the present disclosure. The PUF apparatus 100 comprises a plurality of PUF cells 105$_{x,y}$, a determination unit 170 and a challenge/response unit 180. Whilst only a 2×2 array of PUF cells 105$_{x,y}$ is represented, it will be appreciated that there may be any number of PUF cells, (for example, 8, 12, 20, 32, 128, 256, etc, etc) arranged in an array of any size and dimension, or arranged in any other suitable configuration.

The determination unit 170 is configured to determine a PUF output using the plurality of PUF cells 105$_{x,y}$. The PUF output is a persistent random number, which is explained in more detail in the 'background' section of this disclosure.

The challenge/response unit 180 is configured to receive a 'challenge' from an external entity, request and obtain the PUF output from the determination unit 170 and then determine and return a response based on the challenge and the PUF output. The challenge/response unit 180 may be configured to operate in any suitable way that will be apparent to the person skilled in the art of PUF devices. The challenge/response unit 180 may form a separate unit, or may be part of the determination unit 170. The present disclosure is concerned specifically with the configuration and operation of the PUF cells 105$_{x,y}$ and determination unit 170, as described in detail below. Therefore, no further reference to, or explanation of, the challenge/response unit 180 is given in this disclosure.

Figure 2:
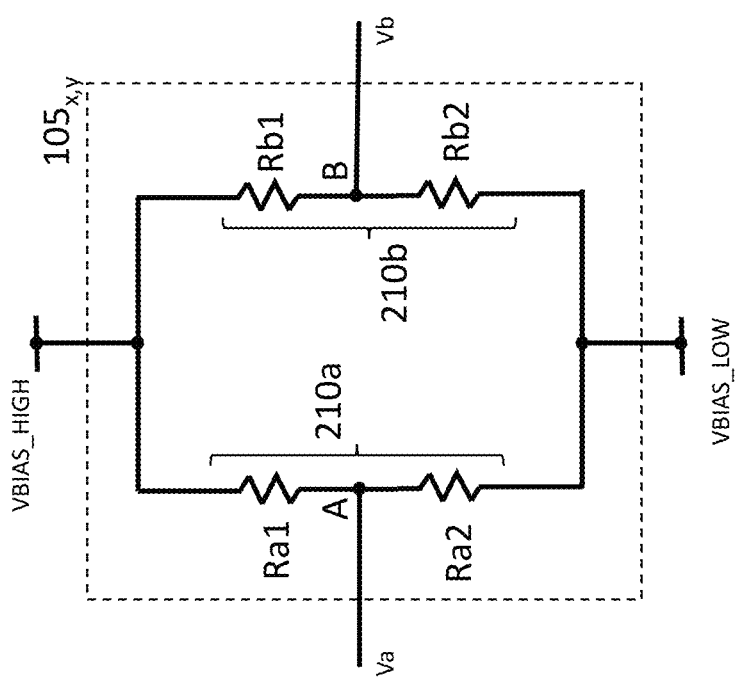
FIG. 2 shows an example representation of a simplified PUF cell from the PUF apparatus/system of FIG. 1.

FIG. 2 shows an example representation of a simplified PUF cell 105$_{x,y}$ according to an aspect of this disclosure. Further details of connections to the determination unit 170 and the ways in which the determination unit 170 may determine a PUF value for at least some of the PUF cells 105$_{x,y}$ are described later.

The PUF cell 105$_{x,y}$ comprises a first potential divider 210a and a second potential divider 210b. The first potential divider 210a comprises a first resistor Ra1 and a second resistor Ra2, connected to each other in series at a first measurement point A. The second potential divider 210b comprises a third resistor Rb1 and a fourth resistor Rb2, connected to each other in series at a second measurement point B. As can be seen in FIG. 2, the resistors within the PUF cell 105$_{x,y}$ are arranged in an H-bridge configuration. An input voltage ($V_{BIASHIGH} - V_{BIASLOW}$) is applied across the first potential divider 210a and the second potential divider 210b. The input voltage is also interchangeably referred to in the present disclosure as the "PUF cell stimuli voltage" and the "stimuli voltage". The values of $V_{BIASHIGH} - V_{BIASLOW}$ may be set to any suitable value and in a number of examples below $V_{BIASLOW}$ is assumed to be ground (although it does not have to be).

The design resistance of resistors Ra1, Ra2, Rb1 and Rb2 may all be the same (i.e., they may all be matched resistors). Alternatively, Ra1 and Rb1 may have the same design resistance as each other (i.e., they may be matched resistors), and Ra2 and Rb2 may have the same design resistance as each other (i.e., they may be matched resistors). Alternatively, each of Ra1, Ra2, Rb1 and Rb2 may have different design resistances, but with the two potential dividers having the same design impedance ratio, i.e. Ra1:Ra2=Rb1:Rb2. In each example, the two devices (eg, the two potential dividers) are matched in that they both have the same design impedance ratio and should therefore, in theory, output the same divided voltage as each other (i.e., in theory Va should equal Vb). However, it will be appreciated that owing to manufacturing variances, the actual resistance of a resistor will be at least slightly different to the design resistance. Consequently, the voltage at measurement point A is likely to be different to the voltage at measurement point B by a random amount for each of the identical PUF cells 105$_{x,y}$. In particular:

$$(Va - V_{BIASLOW}) = (V_{BIASHIGH} - V_{BIASLOW}) \times \frac{(Ra2 + \Delta ra2)}{(Ra1 + \Delta ra1) + (Ra2 + \Delta ra2)}$$

$$(Vb - V_{BIASLOW}) = (V_{BIASHIGH} - V_{BIASLOW}) \times \frac{(Rb2 + \Delta rb2)}{(Rb1 + \Delta rb1) + (Rb2 + \Delta rb2)}$$

where:
$\Delta ra1$=the random difference in resistance for the first resistor from its design value
$\Delta ra2$=the random difference in resistance for the second resistor from its design value
$\Delta rb1$=the random difference in resistance for the third resistor from its design value
$\Delta rb2$=the random difference in resistance for the fourth resistor from its design value Therefore, it can be seen that the difference between Va and Vb should be different for each cell as a result of the random variation in actual resistance of the resistors in the PUF cell. Furthermore, because the H-bridge is ratiometric to the input voltage (the voltage stimuli) $V_{BIASHIGH} - V_{BIASLOW}$, changes in the input voltage over time (for example as a result of temperature changes) should not affect the sign (eg, positive or negative) of Va−Vb. Consequently, the value of Va−Vb for each PUF cell 105$_{x,y}$ should be random and persistent. Therefore, the determination unit 170 can determine a PUF value for each PUF cell 105$_{x,y}$ based on the voltage Va−Vb of each PUF cell 105$_{x,y}$. Further details of how the determination unit 170 may select a particular PUF cell(s) 105$_{x,y}$ and determine its PUF value(s) are described in more detail later.

Figure 3:
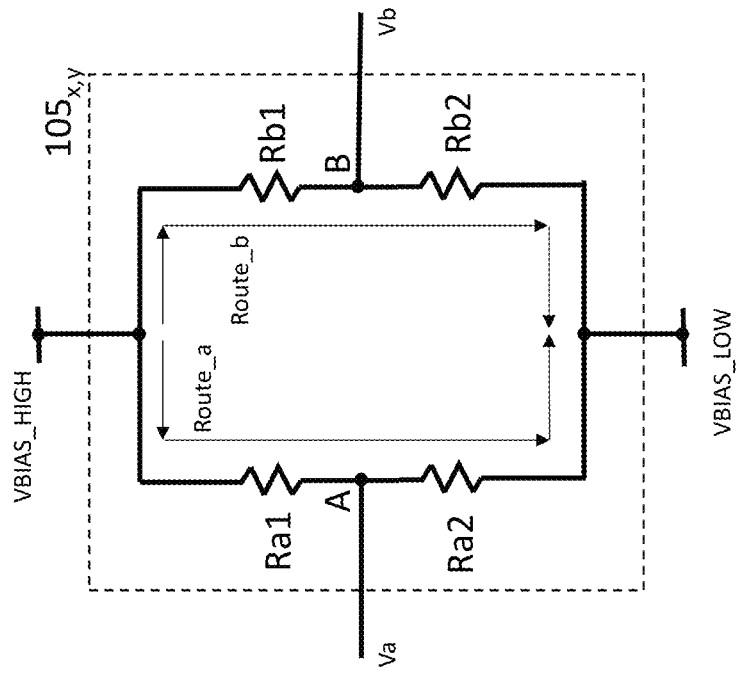
FIG. 3 shows the two current paths through the PUF cell of FIG. 2.

FIG. 3 shows the two current paths, Route_a and Route_b, through the H-bridge of the PUF cell 105$_{x,y}$. It has been recognised that any systematic (i.e., replicated across some or all of the PUF cells) differences between Route_a and Route_b may reduce the randomness of the generated PUF values (for example, a systematic favouring of a particular PUF value for each PUF cell, such that there is not an equal chance of each possible PUF value for each PUF cell—for example a 50% chance it is 0 and a 50% chance it is 1). Therefore, one or more of the design details described below may optionally be used to minimise any systematic bias towards either side of the H-bridge.

Figure 4A:
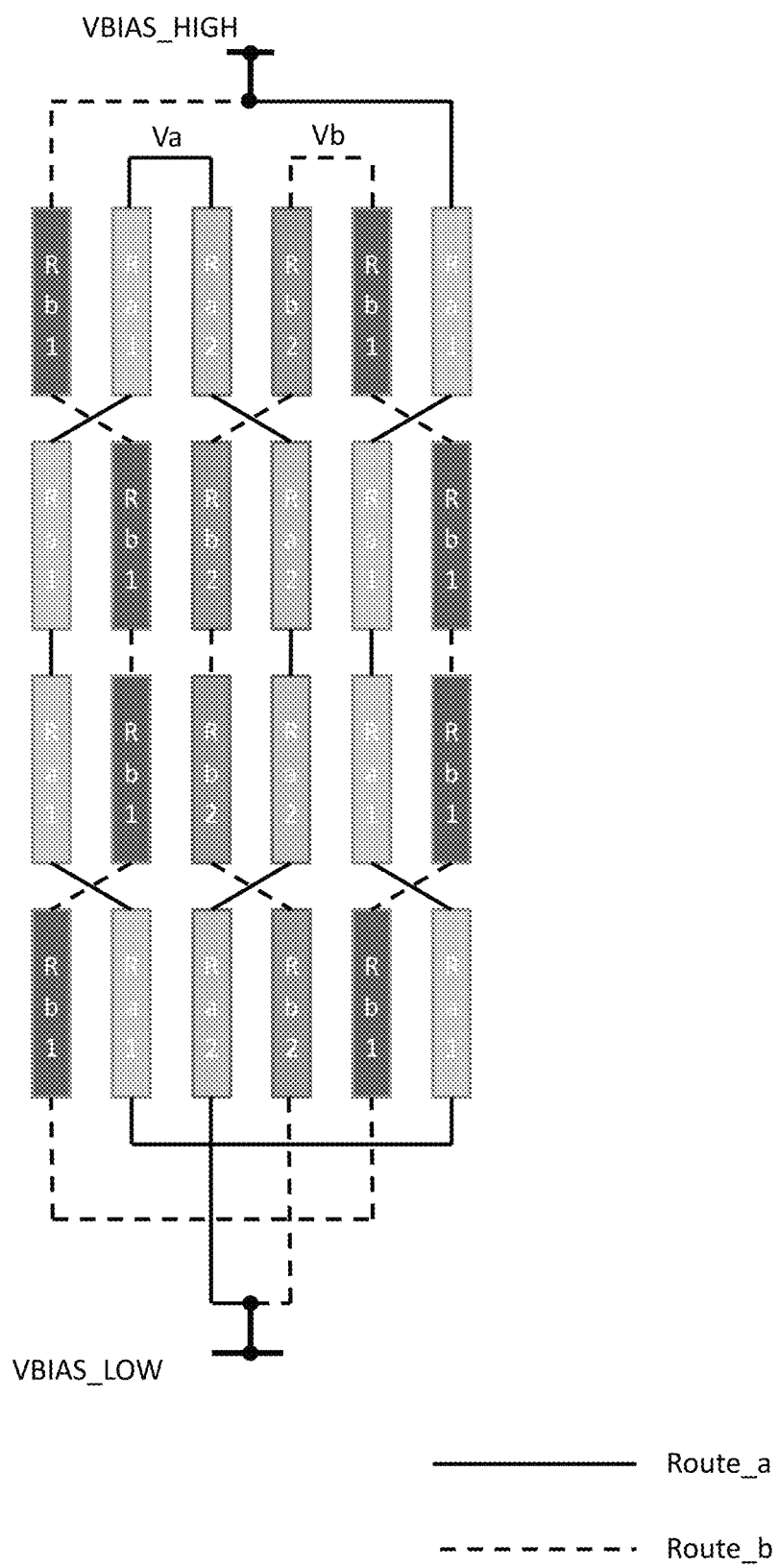
FIG. 4a shows a common centroid placement arrangement for the four resistors of the PUF cell of FIG. 2.

FIG. 4a shows an example common centroid placement arrangement for the four resistors Ra1, Ra2, Rb1 and Rb2, whereby the centre of mass of the elements making up the first potential divider 210a is substantially the same as the centre of mass of the elements making up the second potential divider 210b. The term "substantially the same" is intended to mean "the same to within reasonable or normal manufacturing tolerances".

In the example of FIG. 4a, the first resistor Ra1 and the third resistor Rb1 are matched (i.e., have the same design value) and the second resistor Ra2 and fourth resistor Rb2 are matched (i.e., have the same design value). Each of the four resistors are made up of multiple "unit resistors". Each unit resistor has the same design value. In this example, Ra1 and Rb1 each consist of eight unit resistors and Ra2 and Rb2 each consist of four unit resistors, such that Ra1 and Rb1 have twice the design resistance of Ra2 and Rb2. It will be appreciated that other arrangements are possible with each of the resistors Ra1, Ra2, Rb1 and Rb2 comprising one or more unit resistors, all arranged such that the centre of mass of the first and second potential dividers is substantially the same.

Figure 4B:
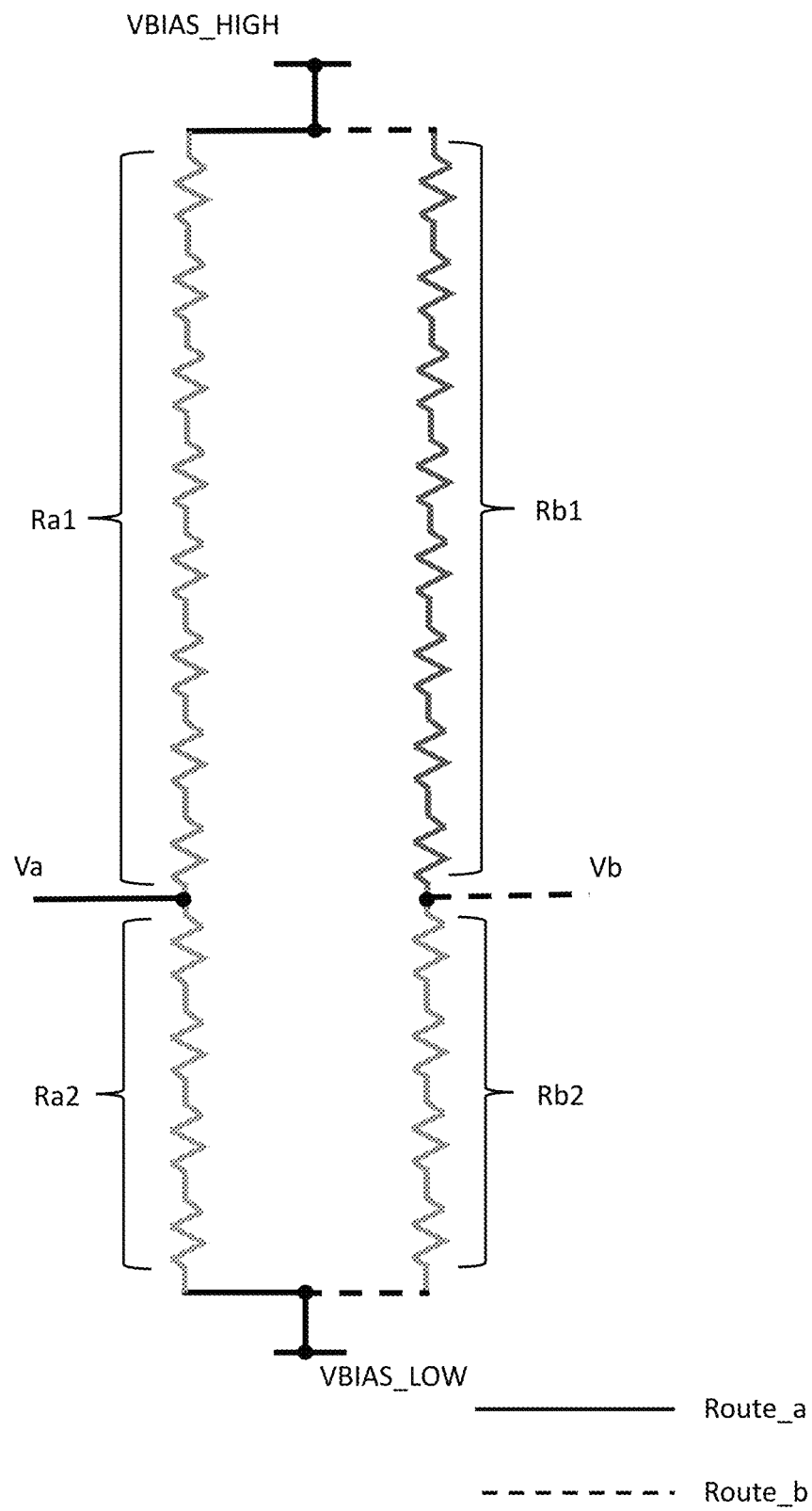

FIG. 4b shows a schematic circuit representation of the potential dividers 210a and 201b made up of the unit resistors.

Returning to FIG. 4a, it can be seen that the centre of mass of the unit resistors (and conductive connections between each unit resistor) making up the first potential divider 210a and the second potential divider 210b is substantially the same. As a consequence, if there is any systematic gradient of resistance change across the PUF cell $105_{x,y}$ and/or across the whole array of PUF cells (for example, caused by doping gradients and/or device thickness gradients in the case where the PUF cells are manufactured using semiconductor processes), that should not result in any systematic bias in the divider ratios of the first potential divider 210a and the second potential divider 210b. Consequently, the randomness of the PUF value generated by each PUF cell should be improved.

Other design aspects that may reduce systematic bias within PUF cells include any one or more of: using the same dimensions for all metal layers (for example, same thickness and width metal traces); using the same number of conductive vias for route_a and route_b; using the same metal structure for both route_a and route_b; using the same metallisation above each resistor. Additionally or alternatively, outputting two analog values Va and Vb (upon which a PUF value is determined) from each PUF cell may also help reduce systematic bias, for example compared with other designs that include additional measuring or digital components within each PUF cell, which may increase the chance of systematic bias.

In order to determine a PUF value for each of one or more PUF cells $105_{x,y}$, the determination unit 170 first selects, or addresses, the one or more PUF cells and then determines a PUF value for each of the selected PUF cells based on the difference between the voltage Va and Vb for those PUF cells. There are many different ways in which the system 100 may be configured to enable PUF cell selection and many different ways in which the voltage difference Va–Vb may be determined for a selected PUF cell(s). Various example selection configurations shall be described first before example PUF value determination (or read out) techniques are described.

In some example implementations, each PUF cell $105_{x,y}$ may comprise a selection mechanism that is controllable by a selection unit that is part of the determination unit 170. The selection mechanism within each PUF cell $105_{x,y}$ may comprise one or more switches, such as transistors, that are controlled by the selection unit.

Figure 5B:
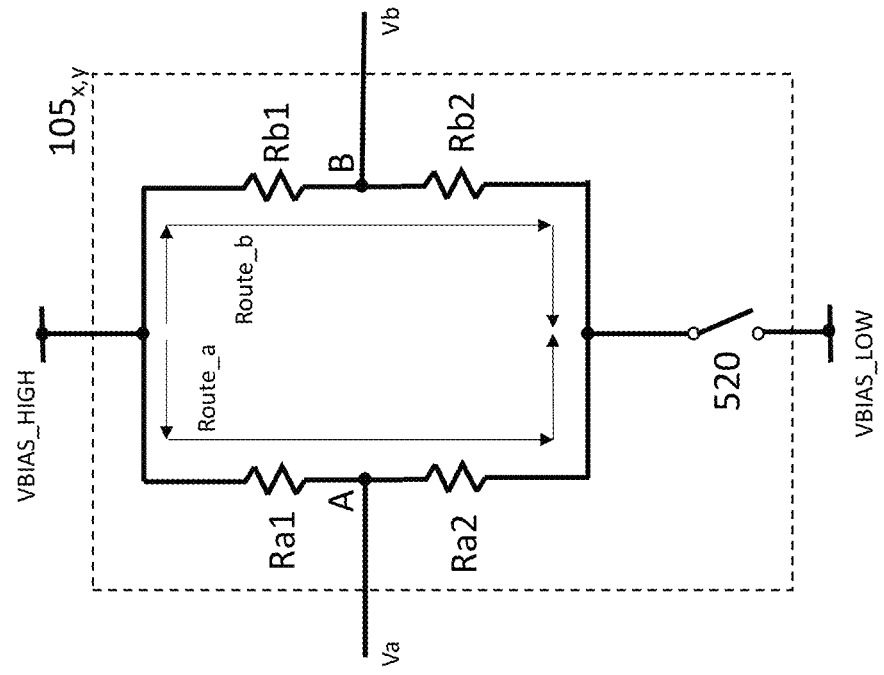
FIG. 5b shows a further example representation of a simplified PUF cell from the PUF apparatus/system of FIG. 1.
Figure 5A:
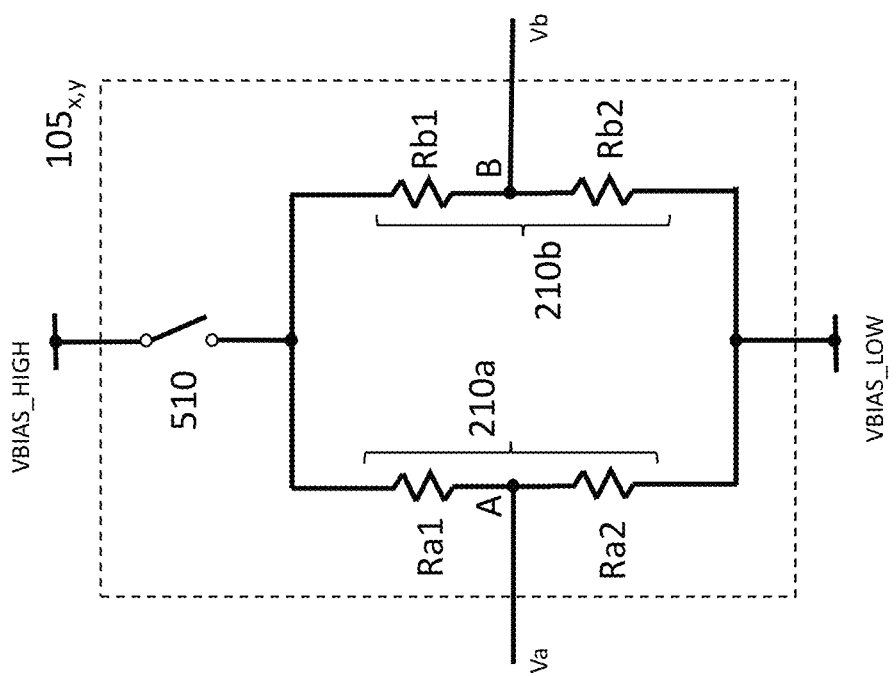
FIG. 5a shows a further example representation of a simplified PUF cell from the PUF apparatus/system of FIG. 1.

FIG. 5a shows one example PUF cell $105_{x,y}$ implementation, where the selection mechanism is a high-side cell enable switch 510 coupled to the first 210a and second 210b potential dividers, such that the first 210a and second 210b potential dividers are switchably coupled to the high-side voltage supply line $V_{BIAS\_HIGH}$ by the cell enable switch 510. This implementation is a form of stimuli selection/addressing, since the PUF cell is selected by applying the voltage stimuli $V_{BIAS\_HIGH}-V_{BIAS\_LOW}$ across it. In this way, individual PUF cells may be selected by switchably coupling the potential dividers to the input/supply voltage, in order to "enable" selected PUF cells FIG. 5b shows a similar "stimuli selection/addressing" example PUF cell $105_{x,y}$ implementation, except the selection mechanism is a low-side cell enable switch 520 coupled to the first 210a and second 210b potential dividers, such that the first 210a and second 210b potential dividers are switchably coupled to the low-side voltage supply line $V_{BIAS\_LOW}$ by the cell enable switch 520.

Figure 5C:
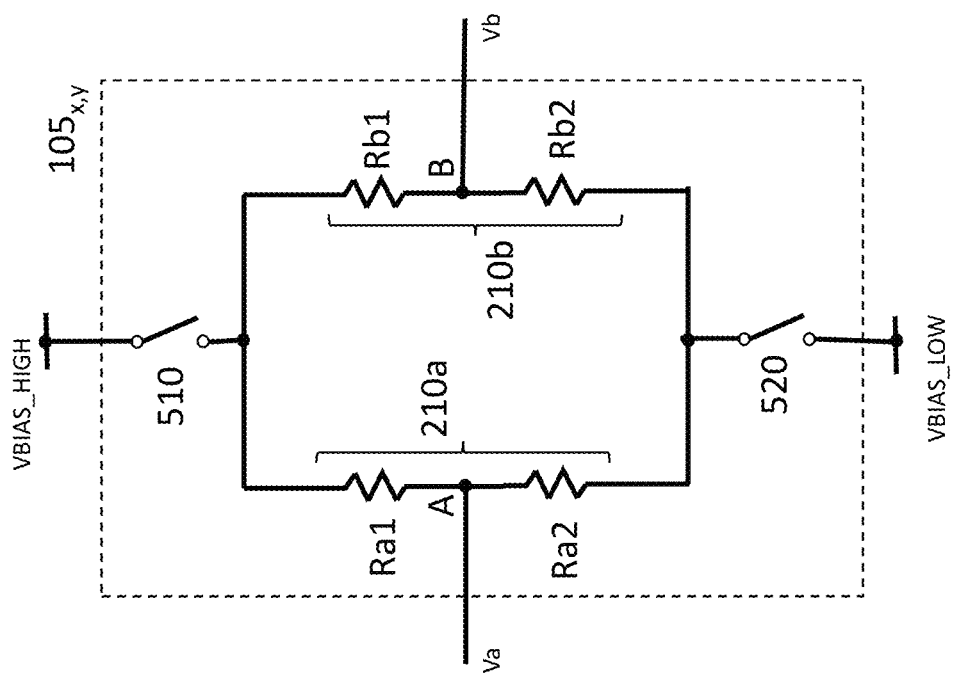
FIG. 5c shows a further example representation of a simplified PUF cell from the PUF apparatus/system of FIG. 1.

FIG. 5c shows another similar "stimuli selection/addressing" example PUF cell $105_{x,y}$ implementation where the selection mechanism comprises both the high-side cell enable switch 510 and the low-side cell enable switch 520, both of which are controlled by the selection unit. In this example, in order to enable a PUF cell so as to select it, the selection unit would control both cell enable switches 510 and 520 to close, thereby coupling the potential dividers 510 and 520 to the input/supply voltage.

In all of these examples, and in later examples where the PUF cells include switches, the switches may be designed to have a low on-state resistance in order to minimise the introduction of process or temperature dependencies by switches.

Additionally or alternatively to the enable switch(es), the selection mechanism in each PUF cell may comprise addressing switches. The addressing switches represent "PUF value addressing" mechanisms, whereby a PUF cell is selected/address by accessing the output of the PUF cell for readout.

Figure 6B:
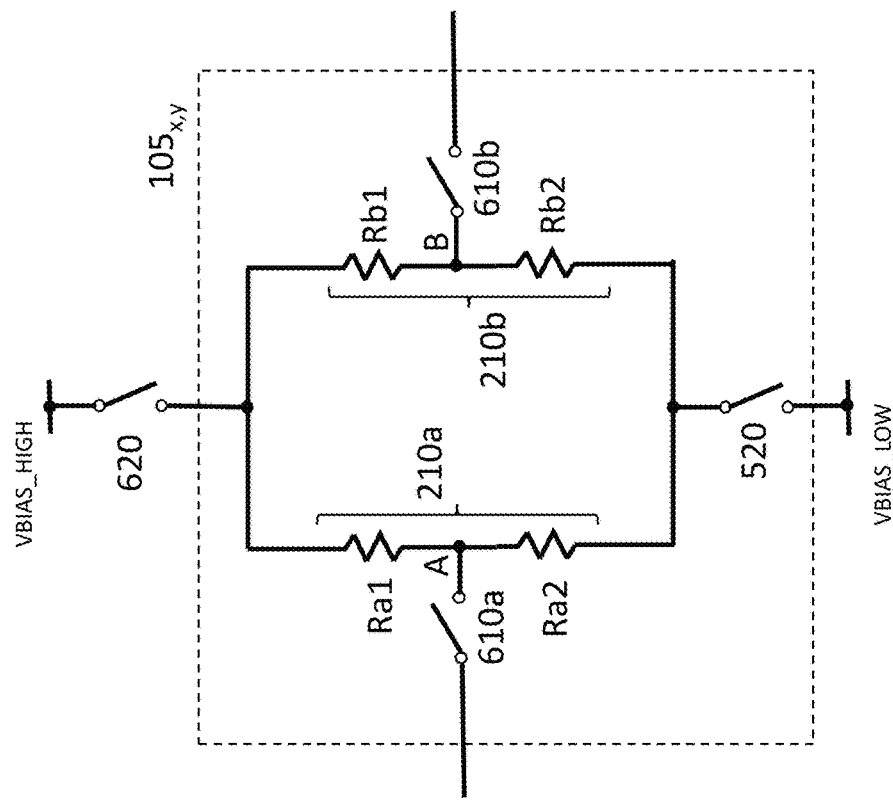
FIG. 6b shows a further example representation of a simplified PUF cell from the PUF apparatus/system of FIG. 1.
Figure 6A:
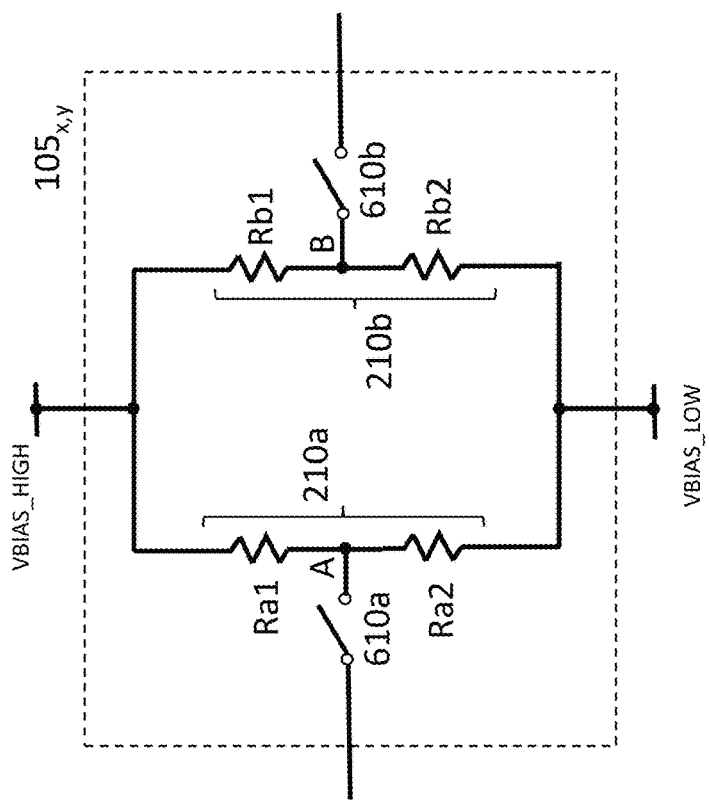
FIG. 6a shows a further example representation of a simplified PUF cell from the PUF apparatus/system of FIG. 1.

FIG. 6a shows an example "PUF value selection/addressing" implementation where the selection mechanism comprises a first addressing switch 610a and a second addressing switch 610b. The first addressing switch 610a is coupled to the first measurement point A and a readout unit of the determination unit 170 (described in more detail later), such that the first measurement point A is switchably coupled to the readout unit by the first addressing switch 610a. The second addressing switch 610b is coupled to the second measurement point B and the readout unit, such that the second measurement point B is switchably coupled to the readout unit by the second addressing switch 610b. In order to select a PUF cell, the selection unit may control the first and second addressing switches 610a and 610b to close, thereby coupling the measurement points A and B to the readout unit in the determination unit 170, where the PUF value is determined based on the difference between voltages Va and Vb. The use of addressing switches for cell selection may be particularly beneficial where the readout unit is coupled to multiple PUF cells by way of common signal lines (as explained in more detail later). The addressing switches improve the isolation of a selected PUF cell from non-selected PUF cells that share the same common signal line and might otherwise influence/affect the impedance of the selected PUF cell. However, addressing switches are not essential even when multiple PUF cells are coupled to the readout unit via common signal lines. For example, each PUF cell may be made high impedance so that unselected PUF cells (for example, those that are unselected by virtue of having a cell enable switch(es) that is open) present a high impedance to the common signal line.

FIG. 6b shows a further example PUF cell implementation, that uses both "stimuli selection/addressing" and "PUF value selection/addressing". The selection mechanism comprises first and second addressing switches 610a and 610b, and a cell enable switch 520, which in this example is low-side connected (although in an alternative there may additionally or alternatively be a high-side cell enable switch 510). Also represented is a common cell enable switch 620. In this example, the common cell enable switch 620 is not part of the selection mechanism of the PUF cell 105, and is instead external to the cell. The common cell enable switch 620 may be shared by a number of PUF cells within a PUF cell array, as explained later. Again, the common cell enable switch 620 is optional and each PUF cell may instead be coupled directly to $V_{BIAS\_HIGH}$, or each PUF cell may comprise a high-side cell enable switch 610.

In this example, the selection mechanism combines the "stimuli selection/addressing" techniques described above in relation to FIGS. 5a-5c, where cells are enabled and disabled by controlling their connection to the input voltage, and the "PUF value selection/addressing" techniques described in relation to FIG. 6a, where the cells are addressed by coupling or decoupling them from the readout unit. By combining both, isolation between selected PUF cells and deselected PUF cells within the cell array may be maximised, thereby minimising the influence that deselected PUF cells may have on selected PUF cells. In order to select a PUF cell, the selection unit may control the addressing switches 610a and 610b, the cell enable switch 520, and the common cell enable switch 620 to be closed. To deselect a PUF cell, the selection unit may control the addressing switches 610a and 610b and the cell enable switch 520 to be open, and optionally also open the common cell enable switch 620 provided no other PUF cell that is connected to the common cell enable switch 620 needs to be coupled to $V_{BIAS\_HIGH}$ (i.e., no other PUF cell sharing that common cell enable switch 620 is desired to be selected).

Figure 7:
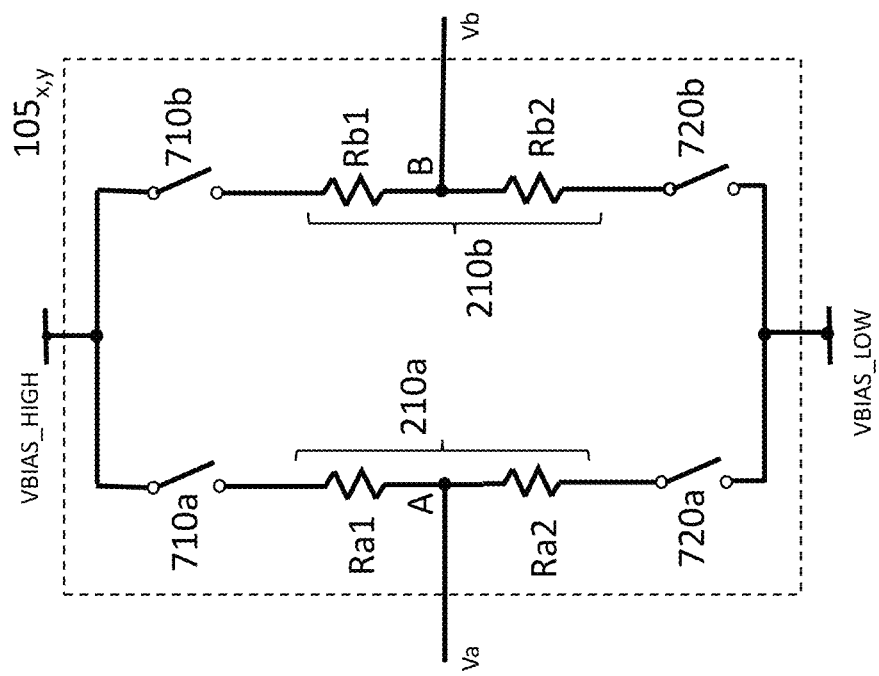
FIG. 7 shows a further example representation of a simplified PUF cell from the PUF apparatus/system of FIG. 1.

FIG. 7 shows a further example "stimuli selection/addressing" implementation of a PUF cell $105_{x,y}$ where the selection mechanism comprises four access switches. A first access switch 710a is coupled to the first resistor Ra1 such that the high voltage supply line $V_{BIAS\_HIGH}$ and the first measurement point A are switchably coupled to each other by the first resistor Ra1 and the first access switch 710a. A second access switch 720a is coupled to the second resistor Ra2 such that the low voltage supply line $V_{BIAS\_LOW}$ and the first measurement point A are switchably coupled to each other by the second resistor Ra2 and the second access switch 720a. A third access switch 710b is coupled to the third resistor Rb1 such that the high voltage supply line $V_{BIAS\_HIGH}$ and the second measurement point B are switchably coupled to each other by the third resistor Rb1 and the third access switch 710b. A fourth access switch 720b is coupled to the fourth resistor Rb2 such that the low voltage supply line $V_{BIAS\_LOW}$ and the second measurement point B are switchably coupled to each other by the fourth resistor Rb2 and the fourth access switch 720b. The measurement points A and B may be directly coupled to the readout unit, either via common signal lines shared by many PUF cells, or by individual signal lines for each PUF cell. In order to select a PUF cell, the selection unit may control all of the access switches to be closed such that the input voltage is applied across the potential dividers and the voltages Va and Vb are generated. To deselect a PUF cell, the selection unit may control the access switches to open, thereby disabling the PUF cell, resulting in a high impedance being presented at the measurement points A and B such that the deselected PUF cell is isolated from and does not interfere with or affect any other PUF cells with which it shares common signal lines to the readout unit.

Figure 8A:
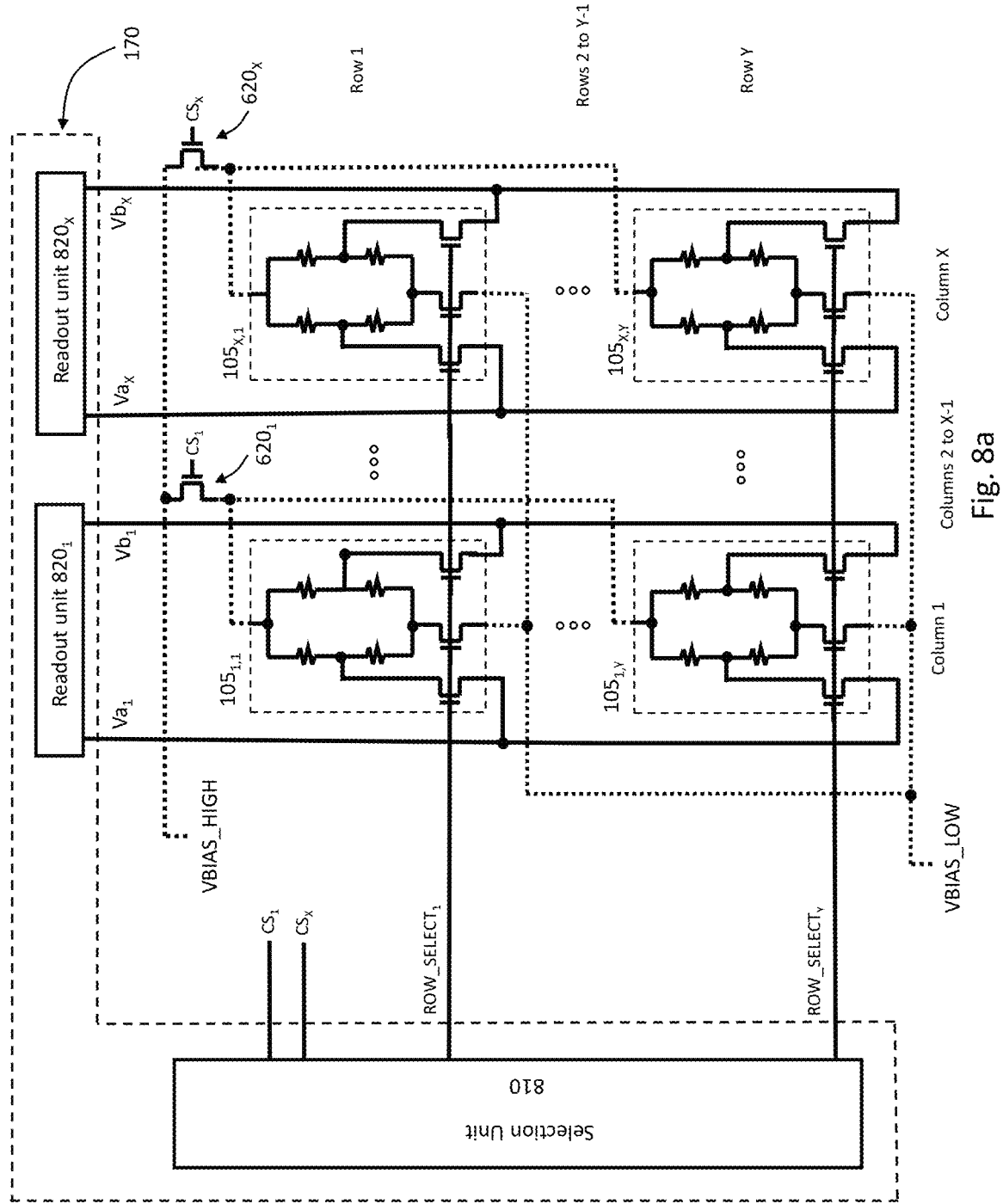
FIG. 8a shows schematic details of an example implementation of the PUF apparatus/system of FIG. 1.

FIG. 8a shows an example array of PUF cells $105_{x,y}$ in accordance with one aspect of the present disclosure. In this example the PUF cells $105_{x,y}$ are configured in accordance with the example of FIG. 6b. However, they could be configured in accordance with any of the examples of FIGS. 2-7. The array consists of X columns of PUF cells and Y rows of PUF cells, such that the total number of PUF cells is equal to XY. The Figure represents only four of the PUF cells, with the cells in rows 2 to Y−1, and columns 2 to X−1, omitted for the sake of clarity.

Figure 8B:
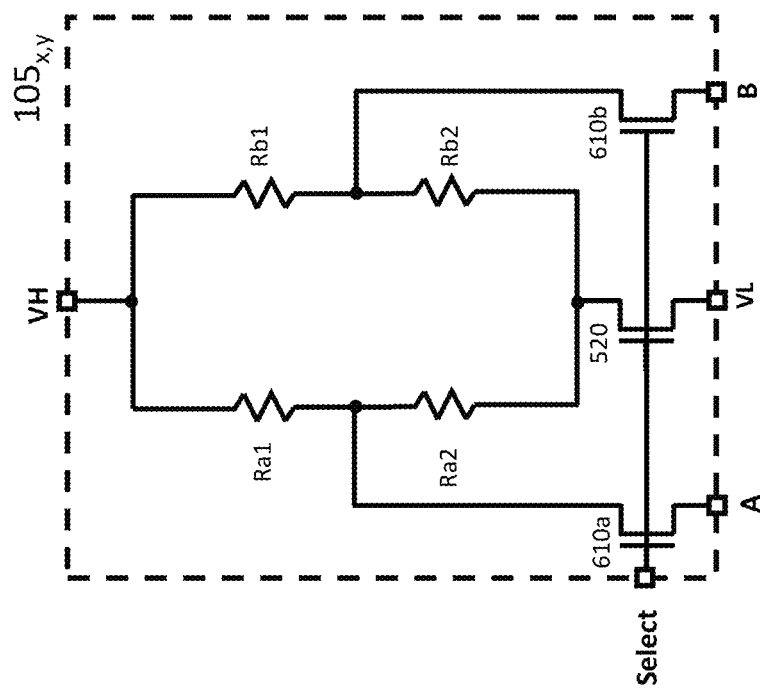

FIG. 8b shows the details of on example PUF cell $105_{x,y}$ within the array represented in FIG. 8a. As can be seen, the cell enable switch 520 and the first and second addressing switches 610a and 610b are all implemented as FETs. Any suitable type of FET may be used (such as NMOS or PMOS), and in an alternative any other suitable type of controllable switch may be used, for example any other type of transistor. The PUF cell $105_{x,y}$ has a number of terminals. There is a "Select" terminal for coupling to a selection signal line for controlling the state of the cell enable switch 520 and the first and second addressing switches 610a and 610b in order to select or deselect the PUF cell. Thus, it can be seen that a single selection control signal can be used to control the state of the PUF cell's selection mechanism. Each of the other selection mechanism examples given in FIGS. 5a-5c, 6a, 6b and 7 can similarly be controlled with a single selection control signal. There are two terminals VH and VL for coupling to the input/supply voltage $V_{BIAS\_HIGH}$ and $V_{BIAS\_LOW}$, as described earlier. Finally, there are two sensing terminals A and B for use in outputting the analog voltages Va and Vb.

Returning to FIG. 8a, it can be seen that the determination unit 170 comprises a selection unit 810 and readout units $820_x$. In this example, there are X readout units, one for each column of the array. The selection unit 810 is coupled to the PUF cells $105_{x,y}$ by Y selection signal lines ROW_SELECT$_y$, one for each row of the array. As can be seen, in this configuration by controlling the selection control signal on a particular ROW_SELECT$_y$ line, all of the PUF cells in that row can be selected or deselected by the selection unit 810. In this example, the selection unit 810 also outputs X column select signals via X column select lines $CS_x$, one for each column of the array. The column select signals $CS_x$ control the state of the common cell enable switches $620_x$, of which there are X in number, one for each column of the array. Therefore, by controlling the column select signals $CS_x$, each column of the array may be enabled or disabled by virtue of coupling or decoupling the PUF cells to the voltage supply $V_{BIAS\_HIGH}$. Consequently, by controlling selection signals on the row select lines ROW_SELECT$_y$ and the column select lines CS$_x$, individual PUF cells may be selected for use in generating a PUF value.

In an alternative, there may be a single column select line coupled to all of the common cell enable switches 620$_x$ such that the selection unit 810 can enable or disable all PUF cells in the array with a single signal. In a further example, a single common cell enable switch 620 may be used, common to all PUF cells, such that all PUF cells can be connected or disconnected from the supply voltage V$_{BIAS\_HIGH}$ by controlling the state of the single common cell enable switch 620. Such implementations may be useful where entire rows of PUF cells are always readout in parallel (as explained in more detail later), with the column select signal being used to disconnect all PUF cells from the power supply completely when the PUF cell array is not being used, thereby potentially saving power consumption during inactive periods.

In a further example, the cell enable switches 620$_x$ in FIG. 8a are implemented as FETs and any suitable type of FET (such as NMOS or PMOS) may be used. In an alternative any other suitable time of controllable switch may be used, for example any other type of transistor. In a further example, the common cell enable switches 620$_x$ may be omitted entirely, with all of the PUF cells permanently connected to V$_{BIAS\_HIGH}$ and selection of PUF cells being executed only by the row select signals. It will be apparent to the skilled person that any suitable type of control signals may be output by the selection unit 810 on the selection signal lines ROW_SELECTx and the column select lines CSx in order to control the state (i.e., on or off) of the switches that they control, depending on the design and operation of the switches. Furthermore, the selection unit 810 may be implemented by any suitable device or circuit that is configured to output appropriate signals on the signal lines in order to control the selection of PUF cells. For example, the selection unit may comprise a processor and memory having instructions that when executed on the processor cause the appropriate signals to be output on the signal lines, or it may comprise a microcontroller configured to perform those functions, or an appropriately configured. FPGA configured to perform those function, or a circuit of discrete components configured to perform those processes. For example, when the challenge/response unit 180 receives a challenge, it may instruct the determination unit 170 (for example, instructing a central controller within the determination unit 170, which then instructs the selection unit 810 and readout units 820x, or instructing the selection unit 810 and readout units 820x directly) to perform the required selection and readout processes in order to generate the PUF output. Whilst not represented in FIG. 8a, the readout units 820x and the selection unit 810 may be in communication with each other (either directly or via a central controller) so that when the readout units 820x have finished determining a PUF value(s) for the selected PUF cell(s), the selection unit 810 may be notified such that it can move on to select the next PUF cell(s) for readout.

In this example, it can be seen that the PUF cells in each column are coupled to the readout unit 820X for that column via two common signal lines, one for signal side A (Va$_x$) and the other for signal side B (Vb$_x$). Each readout unit 820x may comprise any appropriate components and circuitry for determining a PUF value for the selected PUF cell to which it is connected, where that determination is based on the voltage Va at the first measurement point A of the selected PUF cell and the voltage Vb at the second measurement point B of the selected PUF cell. For example, it may comprise a comparator configured to output a first digital value (for example, 0) if Va>Vb and a second digital value (for example, 1) if Va<Vb. In this example, the readout units 820x would effectively compare the difference Va−Vb (for vice versa) to a threshold of "0". In an alternative, it may comprise circuitry for measuring both the sign and magnitude of the difference between Va and Vb, and then comparing that measurement to any suitable threshold(s) in order to generate the PUF value (for example, a threshold of "0", or any other value that should result in an equal probably of generating each available PUF value). For example, an analog to digital converter (ADC) may be used for this purpose, whereby the analog value Va−Vb (or vice versa) is measured by digitizing it using the ADC. In some cases the magnitude and sign of the analog value Va−Vb may be measured only for configuration of the PUF apparatus, for example to determine which of the PUF cells have a Va−Vb with a sufficiently large magnitude that the sign of Va−Vb is likely to stay persistent over time. In this case, during PUF readout to generate a PUF output, only those PUF cells identified as likely to be persistent in the long term may be used for generating the PUF output and a PUF value may be read from each of those PUF cells simply by comparing Va and Vb to determine if Va<Vb or Vb<Va. In other cases, an ADC may be used to determine the magnitude and sign of the analog value Va−Vb during PUF readout in order to determine the PUF value of a PUF cell. Furthermore, the readout units 820x may optionally comprise one or more analog buffers and/or amplifiers in order to perform signal conditioning and/or amplification.

It should be noted that in FIG. 8a, the power lines for V$_{BIAS\_HIGH}$ and V$_{BIAS\_LOW}$ are represented using dotted lines. This is purely to help distinguish those lines from other signal lines in the diagram for the sake of improved clarity.

Figure 9:
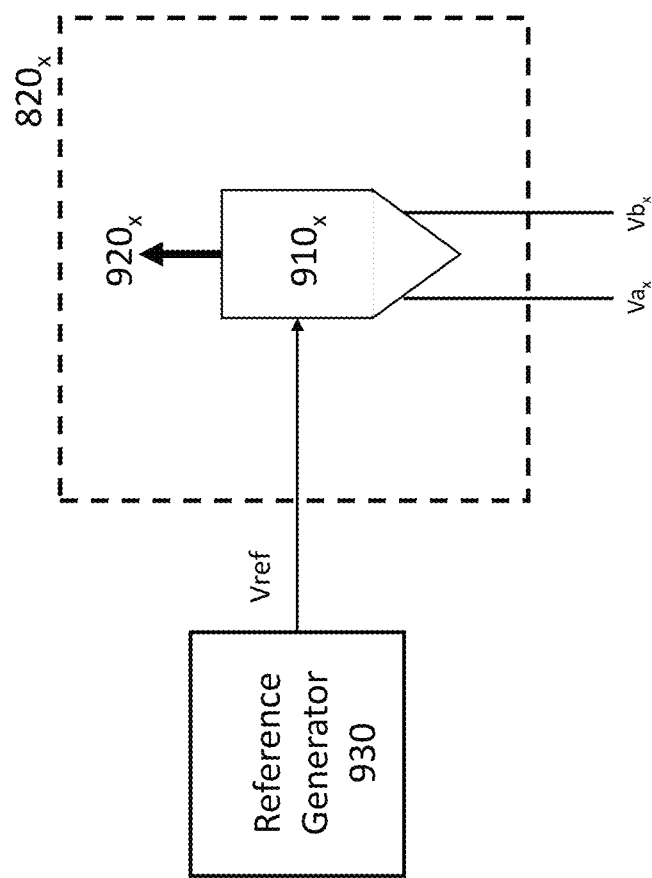

FIG. 9 shows an example configuration of at least part of a readout unit 820x. The readout unit 820x comprises an ADC 910x which in this example is a differential ADC receiving analog values Va$_x$ and Vb$_x$. In an alternative, it may be a single ended ADC, wherein a differential amplifier receives the signals Va$_x$ and Vb$_x$ and outputs a single ended, analog value of the difference between Va$_x$ and Vb$_x$ to the ADC. The ADC may be any type of ADC, for example a slope ADC, a SAR ADC, a sigma-delta ADC, a pipelined ADC, a flash ADC, etc. The ADC outputs a digital measurement 920x of the difference between Va$_x$ and Vb$_x$, which may be output as a multibit digital word in serial or parallel. As will be well understood by the skilled person, the ADC 910x may require a reference voltage Vref, which in this arrangement it may receive from a reference generator 930. An example novel reference generator 930 that may be particularly useful for this apparatus is described later, although any type of voltage reference generator may alternatively be used. The same single reference generator 930 may be used for the ADCs in all of the readout units 920x, or there may be a dedicated reference generator 930 for each readout unit 920x.

The output digital measurement 920x may be used during configuration of the PUF apparatus and/or to determine a PUF value, for example 1 or 0. This may be performed by any suitable downstream circuit, component or unit within the readout unit 820x. For example, the digital measurement 920x may be compared against one or more thresholds (such as "0") and the PUF value set based on that comparison.

The PUF value may then optionally be stored, for example in memory within the determination unit 170 or elsewhere, and when all required PUF values have been determined using the PUF cell array, they may be used to generate and output the PUF output to the challenge/response unit 180. Processes and techniques that may be used to generate and optionally store a PUF value using the digital measurement 920x will be well understood by the skilled person and are not the subject of the present disclosure, so shall not be described in any further detail.

Optionally, the reference voltage Vref output by the reference generator 930 may be associated or linked to the input voltage (stimuli voltage), $V_{BIAS\_HIGH}-V_{BIAS\_LOW}$ used for the PUF cells. For example, the reference voltage Vref may be based on (eg, derived from, or the same as) the input voltage in such a way that a change to the input voltage causes a change to Vref, or the input voltage may be based on (eg, derived from, or the same as) the reference voltage. By having this interdependency, the digital value output from the ADC 910x should be independent from the value of the input voltage, such that it should not change as a result of changes to the input voltage. For example, it can be seen that the analog value Va–Vb that is converted by the ADC 910x is dependent on the input voltage (and the values of the components in the PUF cell). If Vref is proportionally related to the input voltage, any change in Va–Vb caused by a change in the input voltage $V_{BIAS\_HIGH}-V_{BIAS\_LOW}$ should proportionally change the digital conversion performed by the ADC 910x, such that the digital value determined by the ADC 910x should be independent of the input voltage $V_{BIAS\_HIGH}-V_{BIAS\_LOW}$. As a result, the digital output of the ADC 910x should be immune to changes in the input voltage to the PUF cell.

The reference voltage Vref and the input voltage may be ratiometrically linked to each other in a variety of different ways. For example, the reference generator 930 may comprise a voltage source, or a voltage reference such as a band-gap voltage reference, such that Vref is the voltage of the voltage source or voltage reference. The input voltage for the PUF cells may then be derived from Vref, for example as a fraction of Vref generated using a potential divider (made up of, for example, resistors and/or capacitors) to which Vref is applied. Alternatively, the reference generator 930 may be configured to generate Vref based on the input voltage, for example by receiving the input voltage and deriving Vref using one or more potential dividers (made up of, for example, resistors and/or capacitors).

Figure 10A:
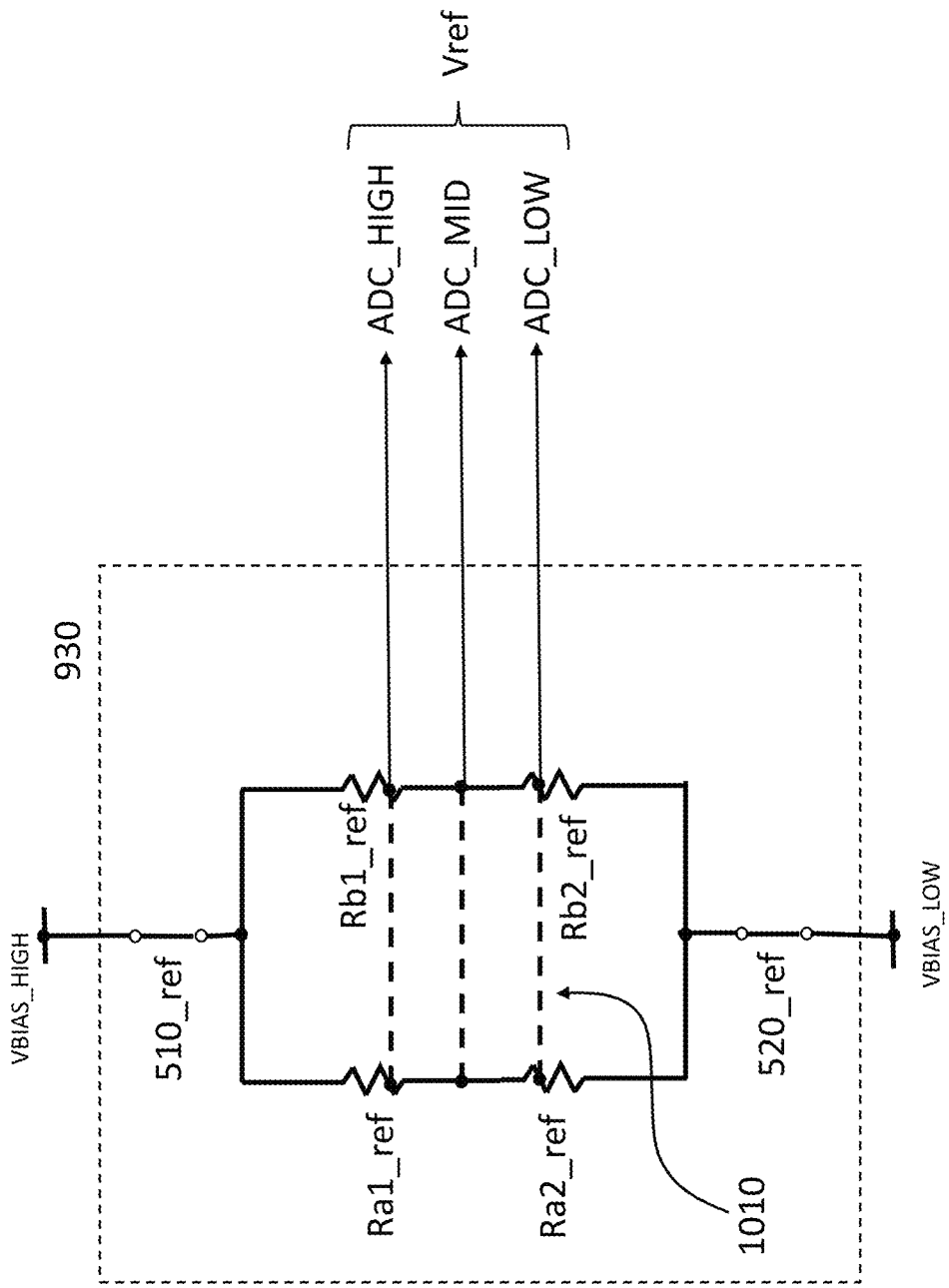
FIG. 10a shows a schematic example implementation of the reference generator of the readout unit of FIG. 9.

FIG. 10a shows one particular example implementation of the reference generator 930, where Vref is derived from the input voltage. The reference generator 930 comprises a ratioed replica of a PUF cell structure (eg, a scaled version of the PUF cell). In particular, there is a first reference resistor Ra1 ref that is a ratioed (scaled) replica of the first resistor Ra1; a second reference resistor Ra2 ref that is a ratioed (scaled) replica of the second resistor Ra2; a third reference resistor Rb1 ref that is a ratioed (scaled) replica of the third resistor Rb1; and a fourth reference resistor Rb2_ref that is a ratioed (scaled) replica of the fourth resistor Rb2. There is also a reference high-side cell enable switch 510_ref that is a ratioed replica of the high-side cell enable switch 510 and a reference low-side cell enable switch 520_ref that is a ratioed replica of the low-side cell enable switch 520. This example is a ratioed replica of the "stimuli selection/addressing" PUF cell represented in FIG. 5c. If a different arrangement is used for the PUF cells, such as those represented in any of FIGS. 5a, 5b, 6b and 7, the reference generator 930 may comprise one or more ratioed replica switches to correspond with the one or more "stimuli selection/addressing" switches that are present in each PUF cell. Furthermore, if a common cell enable switch 620 is used, such as that represented in FIG. 6b, the reference generator 930 may comprise a suitably positioned replica switch, (for example, positioned just as switch 510_ref is positioned in FIG. 10a).

In this particular example, not only may the components of the reference generator 930 replicate the components of the PUF cells (and optionally also any common cell enable switch, where applicable), but the layout of the reference generator 930 may also replicate that of the PUF cells.

Figure 10B:
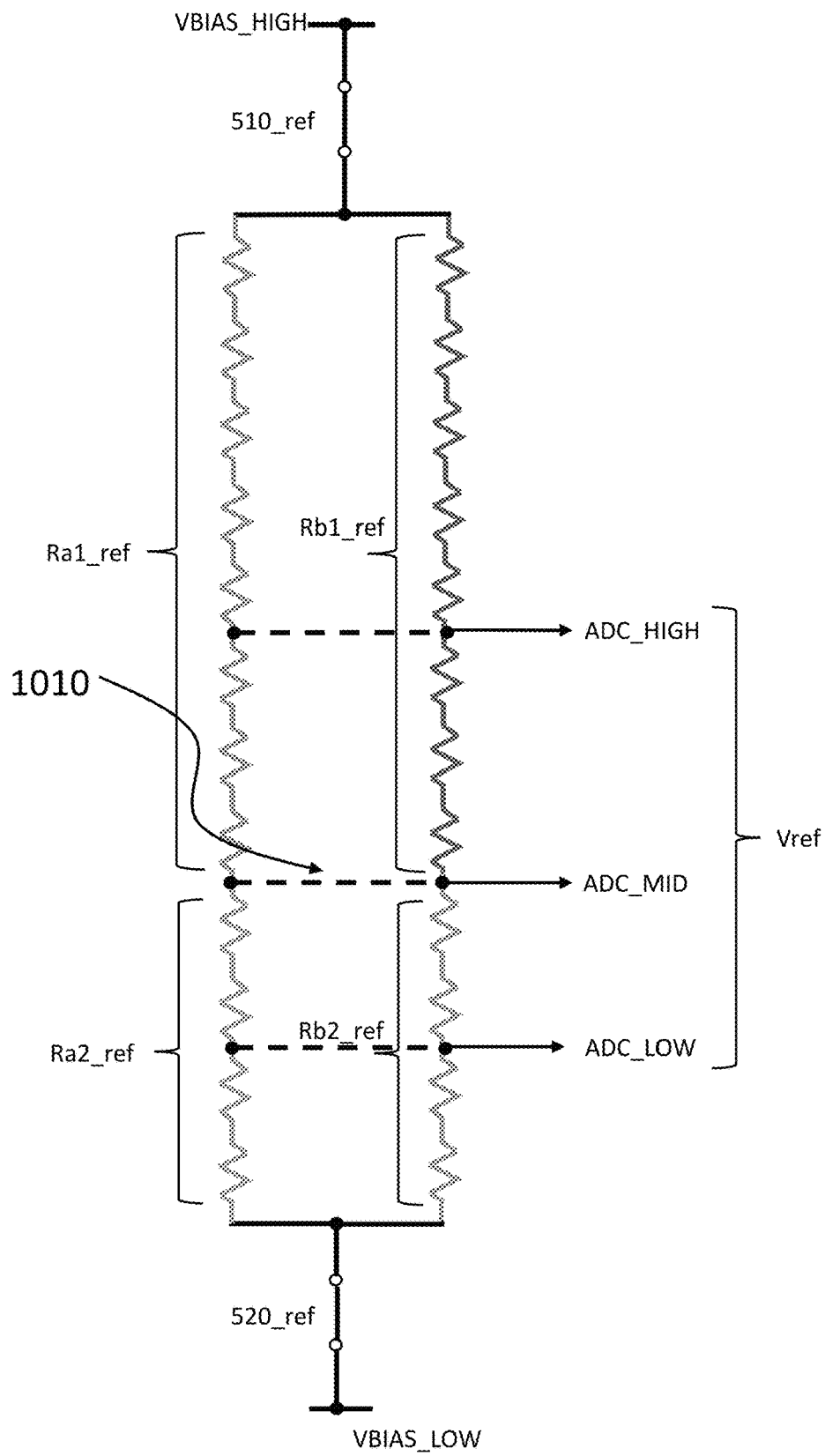

FIG. 10b shows an example of this, where the reference generator 930 is made up of unit resistors that replicate the unit resistors of the PUF cells (in this case, the reference generator 930 replicates the PUF cell arrangement of FIG. 4b). The physical arrangement of the unit resistors and the conductive routing of the reference generator 930 may also replicate that of the PUF cell, for example the arrangement and routing represented in FIG. 4a.

By replicating the components of the PUF cells, and optionally also their physical arrangement and routing, a true replica of the current path from $V_{BIAS\_HIGH}$ to $V_{BIAS\_LOW}$ in each PUF cell may be achieved, such that the voltage drop along the current path of the PUF cells is ratiometrically replicated by reference generator 930. The ratio, or scale, may be any suitable value, for example 1:1 in which case the reference generator components would all be of identical design to the components they are replicating. Alternatively the ratio may be such that the replica components are smaller (eg, dimensionally smaller and having a smaller impedance) than the components of the PUF cell array, for example the size and impedance of each of the components (and optionally also the routing) may be 50% smaller than those of the PUF cells, such that the ratio of the PUF cell to the reference generator 930 is 2:1. Making the size of the replication circuit in the voltage generator 930 smaller than that of the PUF cells may have an additional benefit of improving the drive strength of the derived reference voltage Vref and improving settling time for the reference voltage Vref.

In this example, Vref comprises three reference voltages ADC_HIGH, ADC_MID and ADC_LOW. ADC_HIGH and ADC_LOW may define the conversion range of the ADC 910x. For example, ADC_HIGH may represent the highest expected analog value to be converted (i.e., the maximum expected Va–Vb) and ADC_LOW may represent the lowest expected analog value to be converted (i.e., the minimum expected Va–Vb), optionally with some additional headroom to accommodate errors. ADC_MID is a voltage between ADC_HIGH and ADC_LOW, and may be used, for example, to set the common mode voltage of a sampling circuit of the ADC 910x and/or to precharge terminals of a sampling circuit in the ADC 910x. In one non-limiting example, the ADC 910x may comprise a digital to analog converter (for example, it may be a SAR converter), such as a resistor DAC comprising a string of resistors connected between ADC_HIGH and ADC_LOW.

Each of ADC_HIGH, ADC_MID and ADC_LOW may be derived from the supply voltage VBIAS_HIGH–VBIAS_LOW by tapping off from the ratioed replica of the PUF cell at a suitable point in the potential divider, as represented in FIG. 10b. Where to tap off may be determined in consideration of the supply voltage VBIAS_HIGH and VBIAS_LOW, as well as the impedances of the various components making up the ratioed replica of the PUF cell, in order to achieve the desired reference voltage(s).

In FIGS. 10a and 10b, optional conductive connections 1010 short the two sides of the replica H-bridge at the tap points for the three reference voltages ADC_HIGH, ADC_MID and ADC_LOW. By including the optional conductive connections 1010, a lower equivalent impedance at each tap point for ADC_HIGH, ADC_MID and ADC_LOW may be achieved. This may result in better immunity from transient noise, faster settling and higher driving strength. However, in an alternative implementation at least one, or all, of the conductive connections 1010 may be omitted and the reference generator 930 still generate one or more useful and effective reference voltages Vref. In a further alternative, the optional conductive connections 1010 may not only short the two sides of the H-bridge at the tap points for the reference voltages, but may short the two sides of the replica H-bridge at every unit resistor such that optional conductive connections 1010 in the implementation of represented in FIG. 10b would comprise 11 connections between the two sides of the replica H-bridge.

Figure 10C:
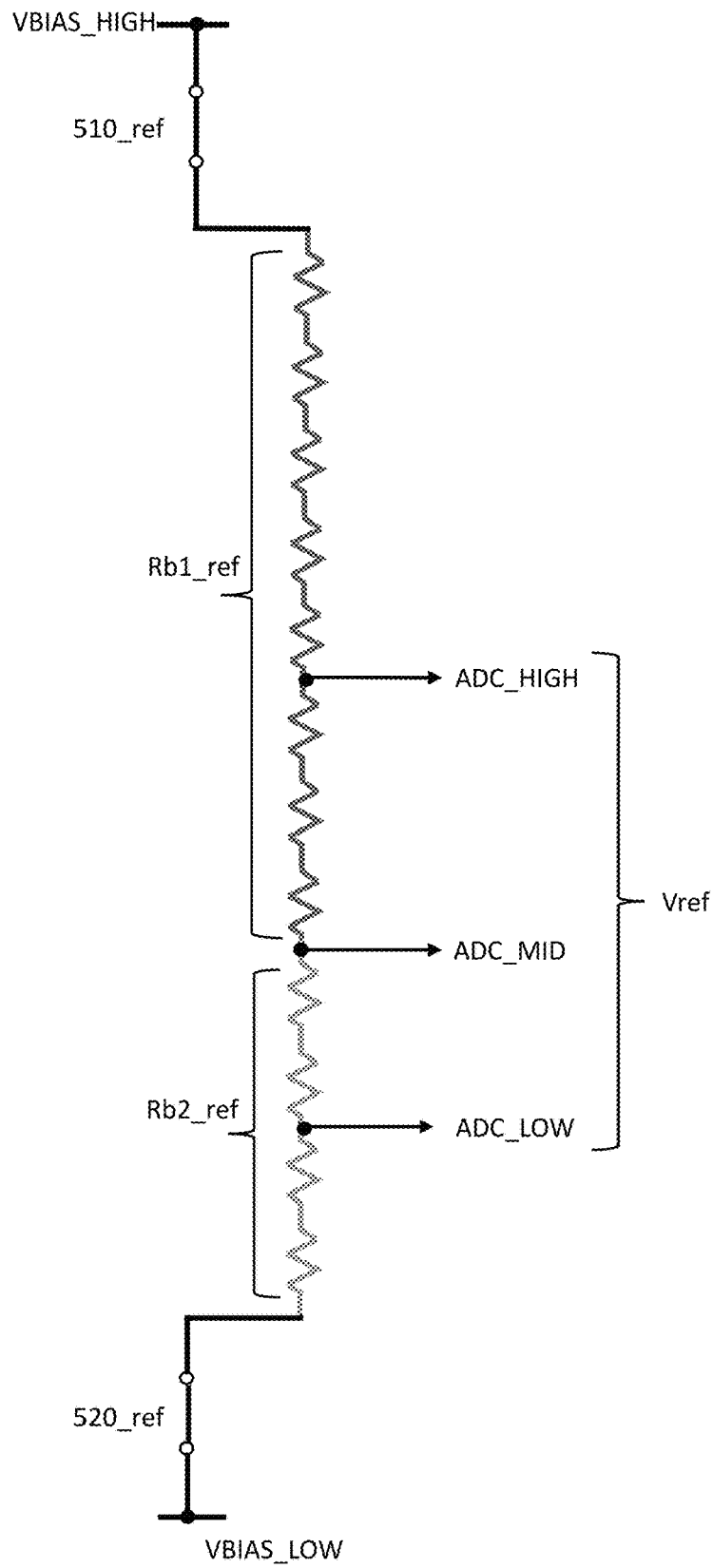
FIG. 10c shows a further schematic example implementation of the reference generator of the readout unit of FIG. 9.

FIG. 10c shows an even further example implementation of the reference generator 930. It is very similar to the implementation represented in FIGS. 10a and 10b, but is a replica of only part of the PUF cell. In particular, it is a replica of just one of the current paths of the PUF cell i.e., a replica of one of the potential dividers of the PUF cell H-bridge and the other components and connections that are common to both potential dividers of the PUF cell H-bridge (for example, the switches 510_ref and 520_ref). Therefore, it can be seen that the implementation of FIG. 10c is a half-bridge replica of the full H-bridge of the PUF cell. This implementation will still generate one or more useful and effective references Vref that are dependent on the voltage VBIAS_HIGH–VBIAS_LOW and the components and interconnections of the PUF cell.

Vref comprising three references is merely one example implementation. Alternatively it may comprise any number of reference voltages, such as just one reference voltage, or two, or four, etc, depending on the requirements of the ADC 910x (which may be any suitable type of ADC).

Whilst in this particular example of a replica circuit the voltage generator 930 comprises an H-bridge of resistors or a half-bridge of resistors (because the PUF cell it is replicating has an H-bridge of resistors), the reference generator 930 could be configured to have a replica of any other type of PUF cell. For example, other types of PUF apparatus might have PUF cells that each include one or more components (such as resistors, capacitors, inductors, transistors, etc) arranged in any suitable manner. An analog to digital conversion system of the type represented in FIG. 9 (with either a differential or single ended ADC) could be used to convert an analog value output from one of those PUF cells, based on which a PUF value could be determined. In this case, the reference generator 930 may comprise a ratioed replica of at least part of the PUF cells (such as a ratioed replica of the components making up at least one current path through the PUF cell), comprising a replica version of one or more components that are part of the PUF cells. The reference generator 930 may therefore receive an input voltage (which is the same stimuli voltage used for the PUF cells in order to create the analog voltage that is output from the PUF cells to the ADC) and output one or more reference voltages that are derived from the input voltage and the replica circuit. In this way, regardless of the components and arrangement of each PUF cell, the ADC may use one or more reference voltages that are dependent on the input voltage and the replica components, such that changes in the input voltage and/or ratioed replica components over time may cause changes to the reference voltage(s) used by the ADC.

By replicating the PUF cell in this way, the reference generator should have the same temperature, process and other environment characteristics as the components that affect the voltages Va and Vb being measured by the ADC. Consequently, not only should any changes in the stimuli voltage be corrected/compensated in the digital conversion by proportionate changes to Vref, but also any changes in the PUF cell components (and common cell enable switch, where applicable) over time, for example as a result of temperature changes, should be replicated by corresponding changes in the reference voltage Vref. This should then modify the analog-to-digital conversion in a way that results in consistent digital measurements of the difference between Va and Vb over time.

In a further alternative, it may be possible to use completely independent voltages for Vref and the input voltage to the PUF cells, which still achieving a digital measurement of Va–Vb that is unchanged by variations in the input voltage. For example, the ADC 910x (or some other ADC) may be used to measure the input voltage to the PUF cell and then subsequently measure Va–Vb, or vice-versa (for example, but using a multiplexer at the input to the ADC 910x to change the input to the ADC 910x between the PUF cell stimuli VBIAS_HIGH–VBIAS_LOW and the PUF cell output Va–Vb). Compensation for any changes in the voltage stimuli may then be performed on the measurement of Va–Vb in the digital domain.

Returning to FIG. 8a, it can be seen that in that example implementation, there is one readout unit 820x for each column of the PUF array. As a result, X PUF cells of the array (i.e., a whole row of PUF cells) can be selected using the row_select signal lines and X PUF values can be determined by the X readout units in parallel. This may improve the speed of generating the PUF output, which may comprise a large number of PUF values and might take a long time to generate if each PUF value is determined in serial. However, including a readout units for each column can be costly both in terms of component costs and overall size of the determination unit 170.

In one alternative implementation, the PUF cell array may be organised to include a plurality of grouped columns, with each grouped column comprising two or more columns of PUF cells. For each grouped column there may be a corresponding readout unit that includes a multiplexer to select which of the columns within the grouped column is to be readout.

Figure 11:
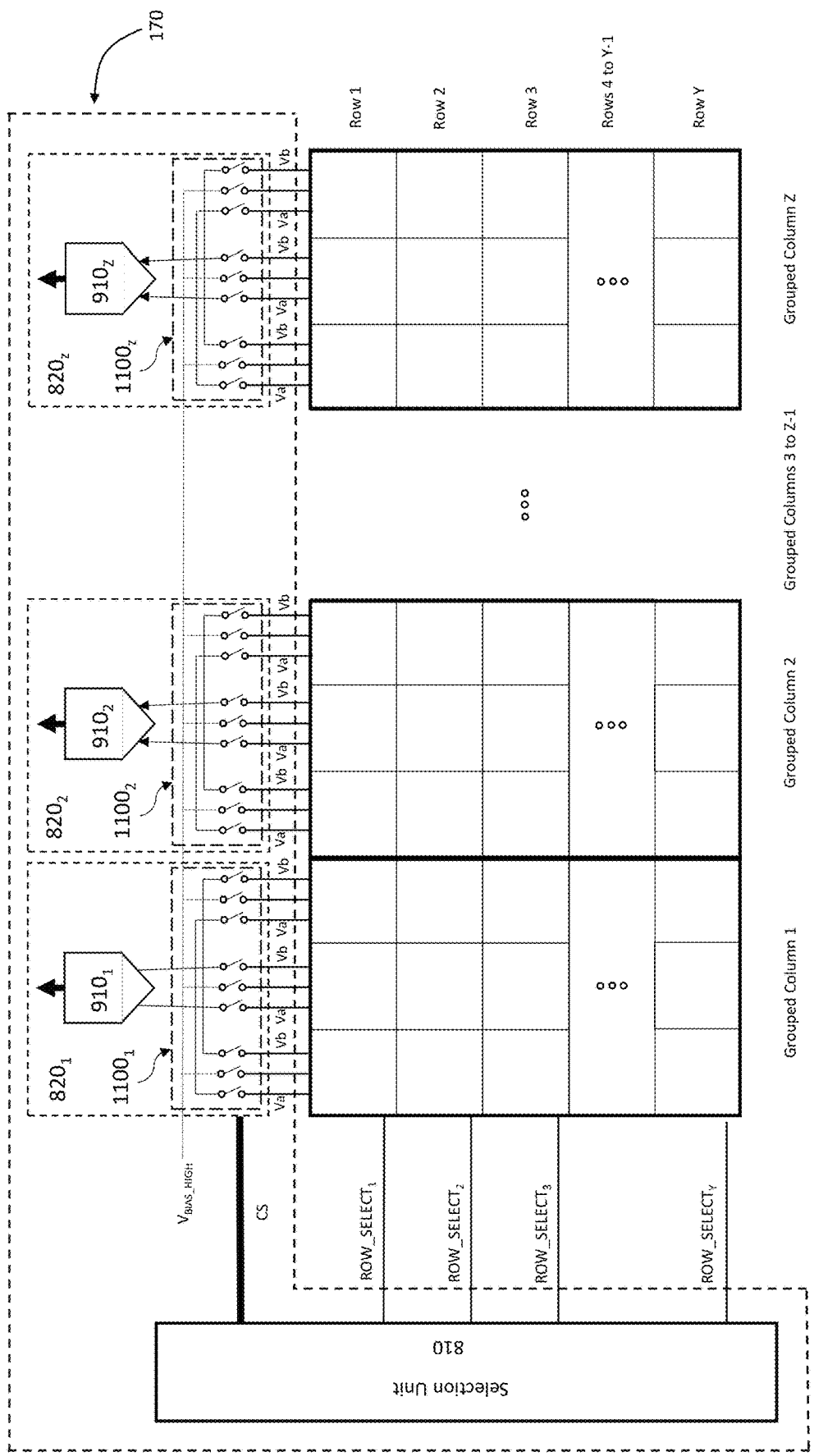
FIG. 11 shows a schematic example of a PUF cell array organised using grouped columns.

FIG. 11 shows an example PUF cell array organised using grouped columns. In this example, there are Z grouped columns in the array, where each grouped column has three columns of PUF cells (although there could be any number of columns of PUF cells in each grouped column). There are also Z readout units $820_z$, one for each grouped column. Each readout unit $820_z$ is similar to the readout unit 820x described earlier, except that each readout unit $820_z$ also includes a multiplexer $1100_z$. Each multiplexer 820z is configured to be controllable by the selection unit 810 using column select lines CS to select which of the columns within each grouped column is coupled to the ADC $910_z$ so that a PUF value can be readout from a PUF cell within that column. For example, if the selection unit 810 is to select the PUF cell that is in the third row of the first column in grouped column 2, it may apply a select signal to ROW_SELECT3, and by using the column select lines CS it may close the switches associated with Va and Vb for the first column in grouped column 2, whilst ensuring the switches associated with the other columns in grouped column 2 are kept open. It may also close the switch that couples the first column in group column 2 to $V_{BIAS\_HIGH}$ such that that column of PUF cells is enabled. This may optionally be replicated across all of the multiplexers 1100z such that the first column of each grouped column can be selected and enabled using a single signal line from the selection unit 810, thereby achieving parallel readout of the PUF cell in the third row, first column of each grouped column. Thus, the selection unit 810 could select a particular row and a particular column within each grouped column of the array, so that Z PUF values may be determined by the Z determination units 820$_z$ in parallel, before then selecting the next column within each grouped column, etc. In this example, the control signal lines CS may comprise a number of signal lines that equals the number of columns in each grouped column (in the example of FIG. 11, that would be three signal lines), one for each column in the grouped columns. For example, a single signal line may control the state of the three switches associated with the first column of each grouped column. A further signal line may control the state of the three switches associated with the second column of each grouped column, etc. As a result, a single signal line may select and enable a column in each grouped column. The signal lines associated with all of the other columns in each grouped column may be set to a state that disables those column by disconnecting them from VBIAS_HIGH and disconnecting them from the ADC$_z$. As a result, power consumption may be reduced by only enabling PUF cells in the columns that are to be readout, and disconnecting the others from the power supply. Each of the switches in each multiplexer 1100z may be implemented using any suitable component or combination of components, for example any suitable transistors such as FETs, of either NMOS or PMOS type.

Therefore, it can be seen that FIG. 11 may achieve a balance between improving speed of readout using parallel PUF cell readout, whilst keeping cost and space usage reasonable by not having an ADC for each column in the array and not powering every column in the array all of the time. The number of grouped columns, and the number of columns in each grouped column, may be set based on the number of PUF values required to generate the PUF output and the particular speed and efficiency needs of the system.

In an alternative, the switches coupling the columns of PUF cells to V$_{BIAS\_HIGH}$ may be omitted entirely, or moved into the PUF cells (as shown in FIGS. 5a and 5c) to be controlled using the row_select signals.

Figure 12:
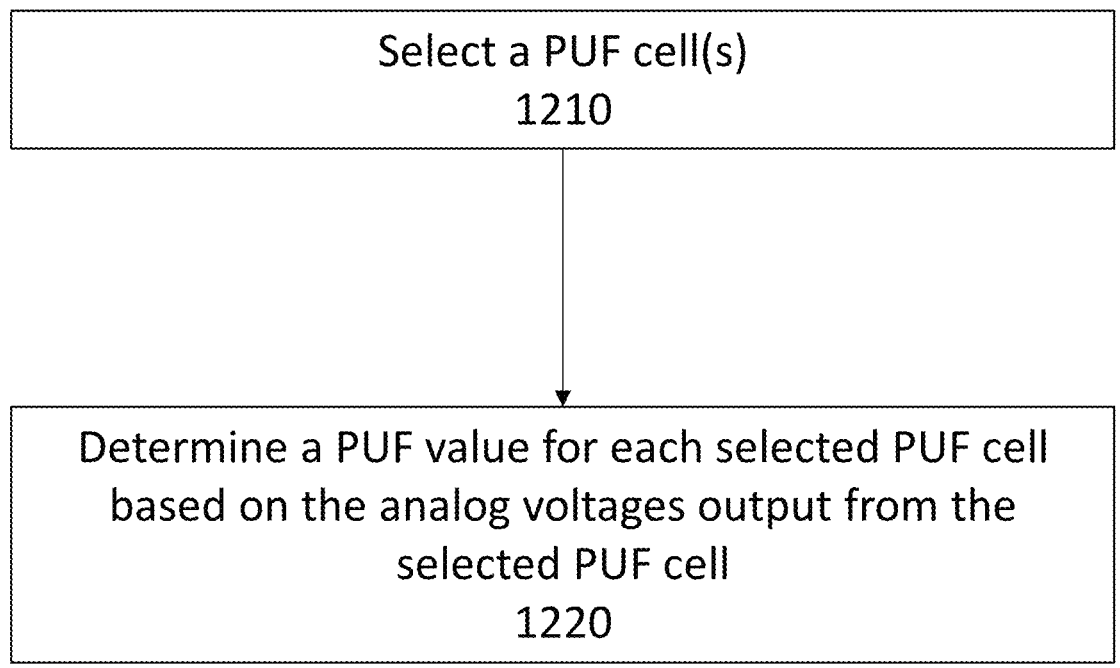
FIG. 12 shows a representation of an example method of determining a PUF value in accordance with the present disclosure.

FIG. 12 shows an example method of determining a PUF value using any of the PUF cell arrangements described earlier. The PUF cells may be arranged in a matrix of rows and columns, or in any other suitable formation.

The method comprises a step 1210 of selecting the PUF cell, which may be achieved using any of the row and/or column selection processes described above. As explained earlier, the PUF cell comprises an H-bridge of resistors and selecting a particular PUF cell results in the PUF cell being enabled by a supply voltage across the H-bridge (VBIAS_HIGH–VBIAS_LOW) and the two measurement points A and B of the H-bridge being coupled to a readout unit. A single PUF cell may be selected in this step, or two or more PUF cells may be selected in parallel.

In step 1220, a PUF value for the selected PUF cell is determined based on the analog voltage Va and Vb at the two measurement points A and B of the PUF cell. The PUF value may be determined using any of the processes and components/circuits/devices described earlier. Furthermore, if two or more PUF cells are selected simultaneously, PUF values for any one or more of those PUF cells may be determined in parallel. After step 1220 is complete, the method may return to step 1210 for selecting the next PUF cell(s) to be read out. Alternatively, if all required PUF values have already been obtained, the method may proceed to a step of determining a PUF output based on all of the determined PUF values.

The skilled person will readily appreciate that various alterations or modifications may be made to the above described aspects of the disclosure without departing from the scope of the disclosure.

The invention claimed is:

1. A Physical Unclonable Function, PUF, apparatus comprising:
   a plurality of PUF cells, each PUF cell comprising:
   a first potential divider comprising a first resistor and a second resistor connected to each other in series at a first measurement point; and
   a second potential divider, coupled in parallel to the first potential divider, and comprising a third resistor and a fourth resistor connected to each other in series at a second measurement point;
   a selection mechanism that is controllable by a selection unit for selecting the PUF cell, wherein the selection mechanism comprises a first cell enable switch coupled to the first potential divider, the second potential divider and a first voltage supply line, wherein the first potential divider and the second potential divider are switchably coupled to the first voltage supply line by the first cell enable switch, wherein a state of the first cell enable switch is controlled by the selection unit, and wherein selecting a PUF cell comprises setting the state of the first cell enable switch in the PUF cell to couple the first potential divider and the second potential divider to the first voltage supply line; and
   a determination unit comprising:
   a selection unit for selecting at least one of the plurality of PUF cells; and
   a readout unit coupled to a first coupling point and a second coupling point of each selected PUF cell and configured to:
   determine a PUF value for the selected PUF cell based on a difference between a first analog voltage at the first measurement point and a second analog voltage at the second measurement point when an input voltage is applied across the first potential divider and the second potential divider.

2. The PUF apparatus of claim 1, wherein for each of the plurality of PUF cells the selection unit is coupled to the selection mechanism with a selection signal line that the selection unit uses to control the selection mechanism by applying a selection control signal to the selection signal line.

3. The PUF apparatus of claim 2, wherein the plurality of PUF cells are organised as a matrix of rows and columns, and
   wherein for each row in the matrix, the PUF cells share a selection signal line and a selection control signal applied to a selection signal line for a particular row of PUF cells controls the selection mechanism in each of PUF cells in that particular row.

4. The PUF apparatus of claim 1, wherein the plurality of PUF cells are organised as a matrix of rows and columns, and wherein the apparatus further comprises:
   for each column in the matrix, a second cell enable switch coupled to a second voltage supply line and to the first potential divider and the second potential divider in each PUF cell in the column, wherein the first potential divider and the second potential divider in each PUF cell in a column of the matrix are coupled to the second voltage supply line by a respective second cell enable switch;

wherein a state of the second cell enable switch is controlled by the selection unit, and wherein selecting a PUF cell comprises setting the state of the second cell enable switch for the column in which the PUF cell is located to couple the first potential divider and the second potential divider to the second voltage supply line.

5. The PUF apparatus of claim 1, wherein for each PUF cell the first resistor and the third resistor are matched resistors, and the second resistor and fourth resistor are matched resistors.

6. The PUF apparatus of claim 5, wherein each of the first resistor, second resistor, third resistor and fourth resistor comprise one or more unit resistor.

7. The PUF apparatus of claim 6, wherein the plurality of unit resistors making up the first potential divider and the second potential dividers are arranged wherein a centre of mass of the unit resistors making up the first potential divider and a centre of mass of the unit resistors making up the second potential divider are alike.

8. A Physical Unclonable Function, PUF, apparatus comprising:
a plurality of PUF cells, each PUF cell comprising:
a first potential divider comprising a first resistor and a second resistor connected to each other in series at a first measurement point; and
a second potential divider, coupled in parallel to the first potential divider, and comprising a third resistor and a fourth resistor connected to each other in series at a second measurement point; and
a selection mechanism that is controllable by a selection unit for selecting the PUF cell, wherein the selection mechanism comprises:
a first addressing switch coupled to the first measurement point and a readout unit, wherein the first measurement point is switchably coupled to the readout unit by the first addressing switch; and
a second addressing switch coupled to the second measurement point and the readout unit, wherein the second coupling point is switchably coupled to the readout unit by the second addressing switch,
wherein a state of the first addressing switch and a state of the second addressing switch is controlled by the selection unit, and
wherein selecting a PUF cell comprises setting the state of the first addressing switch in the PUF cell to couple the first measurement point to the readout unit, and setting the state of the second addressing switch in the PUF cell to couple the second measurement point to the readout unit; and
a determination unit comprising:
a selection unit for selecting at least one of the plurality of PUF cells; and
a readout unit coupled to the first coupling point and the second coupling point of each selected PUF cell and configured to:
determine a PUF value for the selected PUF cell based on a difference between a first analog voltage at the first measurement point and a second analog voltage at the second measurement point when an input voltage is applied across the first potential divider and the second potential divider.

9. A Physical Unclonable Function, PUF, apparatus comprising:
a plurality of PUF cells, each PUF cell comprising:
a first potential divider comprising a first resistor and a second resistor connected to each other in series at a first measurement point; and
a second potential divider, coupled in parallel to the first potential divider, and comprising a third resistor and a fourth resistor connected to each other in series at a second measurement point; and
a selection mechanism that is controllable by a selection unit for selecting the PUF cell, wherein the selection mechanism comprises:
a first access switch coupled to the first resistor, wherein a high voltage supply line and the first measurement point are switchably coupled to each other by the first resistor and the first access switch;
a second access switch coupled to the second resistor, wherein a low voltage supply line and the first measurement point are switchably coupled to each other by the second resistor and the second access switch;
a third access switch coupled to the third resistor, wherein the high voltage supply line and the second measurement point are switchably coupled to each other by the third resistor and the third access switch; and
a fourth access switch coupled to the fourth resistor, wherein the low voltage supply line and the second measurement point are switchably coupled to each other by the fourth resistor and the fourth access switch,
wherein a state of the first access switch, a state of the second access switch, a state of the third access switch and a state of the fourth access switch are controlled by the selection unit; and
a determination unit comprising:
a selection unit for selecting at least one of the plurality of PUF cells; and
a readout unit coupled to the first coupling point and the second coupling point of each selected PUF cell and configured to:
determine a PUF value for the selected PUF cell based on a difference between a first analog voltage at the first measurement point and a second analog voltage at the second measurement point when an input voltage is applied across the first potential divider and the second potential divider.

10. A Physical Unclonable Function, PUF, apparatus comprising:
a plurality of PUF cells, each PUF cell comprising:
a first potential divider comprising a first resistor and a second resistor connected to each other in series at a first measurement point; and
a second potential divider, coupled in parallel to the first potential divider, and comprising a third resistor and a fourth resistor connected to each other in series at a second measurement point; and
a readout unit that further comprises an analog to digital converter, ADC, coupled to the first measurement point and the second measurement point of a selected PUF cell and configured to generate a digital representation of a difference between a first analog voltage at the first measuring point and a second analog voltage at the second measuring point,
wherein the PUF apparatus further comprises a voltage reference generator for supplying at least one ADC reference voltage to the ADC, wherein the at least one ADC reference voltage is associated with an input voltage in such a way that a change in the input voltage is reflected by a change in the at least one ADC reference voltage, wherein the voltage reference generator comprises a ratioed replica of at least part of a PUF cell for generating the at least one ADC reference voltage.

11. The PUF apparatus of claim 10, wherein the reference generator receives the input voltage and generates the at least one ADC reference voltage based on the input voltage.

12. The PUF apparatus of claim 11, wherein the voltage reference generator comprises a ratioed replica of at least one current path of a PUF cell and the input voltage is applied across the ratioed replica of the PUF cell, and wherein the at least one ADC reference voltage is derived from a potential divider of the ratioed replica of the PUF cell.

13. The PUF apparatus of claim 12, wherein the plurality of PUF cells are organised as a matrix of rows and columns, and
wherein the matrix of PUF cells are organised as a plurality of grouped columns, with each grouped column comprises two or more columns of PUF cells, and
comprising a determination unit that comprises a readout unit for each grouped column, and
wherein each readout unit comprises a multiplexer for selecting any one of the columns within the grouped column for the determination of a PUF value.

14. A method of determining a Physical Unclonable Function, PUF, value using a PUF cell that is one of a plurality of PUF cells, the method comprising:
selecting the PUF cell, wherein the PUF cell comprises an H-bridge of resistors including a first potential divider comprising a first resistor and a second resistor connected to each other in series at a first measurement point, and including a second potential divider, coupled in parallel to the first potential divider, and comprising a third resistor and a fourth resistor connected to each other in series at a second measurement point, the selecting comprising using a selection mechanism including a first cell enable switch to switchably couple the first potential divider and the second potential divider to a first voltage supply line, thereby selecting the PUF cell and selectively switching the PUF cell to be selectively connected to the first voltage supply across the H-bridge and selectively switching first and second measurement points of the H-bridge to be selectively coupled to a readout unit; and
determining, by a readout unit, the PUF value for the PUF cell based on a difference between a first analog voltage at the first measurement point and a second analog voltage at the second measurement point when an input voltage is applied across the first potential divider and the second potential divider.

15. A PUF apparatus comprising:
a, Physical Unclonable Function, PUF, cell comprising at least one component comprising:
a first potential divider comprising a first resistor and a second resistor connected to each other in series at a first measurement point; and
a second potential divider, coupled in parallel to the first potential divider, and comprising a third resistor and a fourth resistor connected to each other in series at a second measurement point;
a selection mechanism that is controllable by a selection unit for selecting the PUF cell by selectively switchably coupling the PUF cell, using a first cell enable switch coupled to the first potential divider, the second potential divider, and an input voltage, to connect the PUF cell to an input voltage applied across first and second potential dividers; and
a readout unit configured to determine a PUF value for the selected PUF cell based on a difference between a first analog voltage at the first measurement point and a second analog voltage at the second measurement point when the input voltage is applied across the first potential divider and the second potential divider, the readout unit comprising:
an analog-to-digital converter for converting an analog value received from the PUF cell, wherein the analog value is dependent on the at least one component in the PUF cell and a stimuli voltage applied to the PUF cell; and
a reference generator configured to supply to the analog-to-digital converter a reference voltage, wherein either:
the reference voltage is dependent on the stimuli voltage wherein a change in stimuli voltage causes a change in reference voltage, or the stimuli voltage is dependent on the reference voltage wherein a change in reference voltage causes a change in stimuli voltage.

16. The PUF apparatus of claim 15, wherein the reference generator further comprises a replica of at least part of the PUF cell,
wherein the reference generator is configured to generate the reference voltage using the stimuli voltage and the replica of the at least part of the PUF cell.

17. The PUF apparatus of claim 16, wherein the PUF cell comprises a potential divider and the replica of the PUF cell comprises a replica of the potential divider, and
wherein the stimuli voltage is applied to the replica of the potential divider and the reference voltage is derived from the replica of the potential divider.

18. The PUF apparatus of claim 16, wherein the at least one component in the replica of the PUF cell is identical to the at least one component in the PUF cell, or is a smaller, scaled version of the at least one component of the PUF cell.

* * * * *